(12) United States Patent
Felstaine et al.

(10) Patent No.: US 9,460,286 B1
(45) Date of Patent: Oct. 4, 2016

(54) SYSTEM, METHOD, AND COMPUTER PROGRAM FOR MANAGING SECURITY IN A NETWORK FUNCTION VIRTUALIZATION (NFV) BASED COMMUNICATION NETWORK

(71) Applicant: Amdocs Software Systems Limited, Dublin (IE)

(72) Inventors: Eyal Felstaine, Hertzeliya (IL); Ofer Hermoni, Yavne (IL); Nimrod Sandlerman, Ramat-Gan (IL)

(73) Assignee: Amdocs Software Systems Limited, Dublin (IE)

( * ) Notice: Subject to any disclaimer, the term of this patent is extended or adjusted under 35 U.S.C. 154(b) by 0 days.

(21) Appl. No.: 14/572,723

(22) Filed: Dec. 16, 2014

Related U.S. Application Data

(60) Provisional application No. 61/918,597, filed on Dec. 19, 2013, provisional application No. 61/941,380, filed on Feb. 18, 2014, provisional application No. 61/981,116, filed on Apr. 17, 2014, provisional application No. 62/026,508, filed on Jul. 18, 2014, provisional application No. 62/027,709, filed on Jul. 22, 2014.

(51) Int. Cl.
*H04L 29/06* (2006.01)
*G06F 21/56* (2013.01)
*G06F 21/43* (2013.01)

(52) U.S. Cl.
CPC ............. *G06F 21/567* (2013.01); *G06F 21/43* (2013.01)

(58) Field of Classification Search
CPC .................................................... G06F 21/567
USPC ............................................................ 726/23
See application file for complete search history.

(56) References Cited

U.S. PATENT DOCUMENTS

| | | | |
|---|---|---|---|
| 6,345,239 B1 | 2/2002 | Bowman-Amuah | |
| 6,427,132 B1 | 7/2002 | Bowman-Amuah | |
| 6,611,867 B1 | 8/2003 | Bowman-Amuah | |
| 6,629,081 B1 | 9/2003 | Cornelius et al. | |
| 6,983,037 B2 | 1/2006 | Argo | |
| 7,069,234 B1 | 6/2006 | Cornelius et al. | |
| 7,167,844 B1 | 1/2007 | Leong et al. | |
| 7,266,702 B2 * | 9/2007 | Hotti ................... | G06F 21/6227 707/999.009 |
| 7,610,233 B1 | 10/2009 | Leong et al. | |
| 7,860,232 B2 | 12/2010 | Huang | |

(Continued)

FOREIGN PATENT DOCUMENTS

| | | |
|---|---|---|
| WO | 01/07170 A1 | 2/2001 |
| WO | 01/16849 A2 | 3/2001 |

(Continued)

OTHER PUBLICATIONS

US 8089898, Jan. 3, 2012, Headwater Partners I, LLC (withdrawn).

*Primary Examiner* — Longbit Chai
(74) *Attorney, Agent, or Firm* — Zilka-Kotab, PC

(57) ABSTRACT

A system, method, and computer program product are provided for providing security in a Network Function Virtualization based (NFV-based) communication network. In operation, a security attack is identified. Additionally, a first hardware unit attacked by the security attack is identified. Further, a hardware unit in which to initiate a security defense software program is identified. Moreover, the security defense software program is initiated in the identified hardware unit.

4 Claims, 15 Drawing Sheets

(56) References Cited

U.S. PATENT DOCUMENTS

| | | |
|---|---|---|
| 8,023,425 B2 | 9/2011 | Raleigh |
| 8,023,494 B2 | 9/2011 | Takeda |
| 8,166,176 B2 | 4/2012 | Kumar et al. |
| 8,229,812 B2 | 7/2012 | Raleigh |
| 8,250,207 B2 | 8/2012 | Raleigh |
| 8,270,310 B2 | 9/2012 | Raleigh |
| 8,270,952 B2 | 9/2012 | Raleigh |
| 8,321,526 B2 | 11/2012 | Raleigh |
| 8,326,958 B1 | 12/2012 | Raleigh |
| 8,331,901 B2 | 12/2012 | Raleigh |
| 2008/0095138 A1 | 4/2008 | Wu et al. |
| 2010/0085914 A1 | 4/2010 | Kunniyur et al. |
| 2010/0188975 A1 | 7/2010 | Raleigh |
| 2010/0188990 A1 | 7/2010 | Raleigh |
| 2010/0188991 A1 | 7/2010 | Raleigh |
| 2010/0188992 A1 | 7/2010 | Raleigh |
| 2010/0188993 A1 | 7/2010 | Raleigh |
| 2010/0188994 A1 | 7/2010 | Raleigh |
| 2010/0188995 A1 | 7/2010 | Raleigh |
| 2010/0190470 A1 | 7/2010 | Raleigh |
| 2010/0191575 A1 | 7/2010 | Raleigh |
| 2010/0191576 A1 | 7/2010 | Raleigh |
| 2010/0191604 A1 | 7/2010 | Raleigh |
| 2010/0191612 A1 | 7/2010 | Raleigh |
| 2010/0191613 A1 | 7/2010 | Raleigh |
| 2010/0191846 A1 | 7/2010 | Raleigh |
| 2010/0191847 A1 | 7/2010 | Raleigh |
| 2010/0192120 A1 | 7/2010 | Raleigh |
| 2010/0192170 A1 | 7/2010 | Raleigh |
| 2010/0192207 A1 | 7/2010 | Raleigh |
| 2010/0192212 A1 | 7/2010 | Raleigh |
| 2011/0103374 A1 | 5/2011 | Lajoie et al. |
| 2011/0107364 A1 | 5/2011 | Lajoie et al. |
| 2011/0107379 A1 | 5/2011 | Lajoie et al. |
| 2012/0088470 A1 | 4/2012 | Raleigh |
| 2012/0089845 A1 | 4/2012 | Raleigh |
| 2012/0134291 A1 | 5/2012 | Raleigh |
| 2012/0195206 A1 | 8/2012 | Raleigh |
| 2012/0195222 A1 | 8/2012 | Raleigh |
| 2012/0195223 A1 | 8/2012 | Raleigh |
| 2012/0196565 A1 | 8/2012 | Raleigh |
| 2012/0197792 A1 | 8/2012 | Raleigh |
| 2012/0201133 A1 | 8/2012 | Raleigh |
| 2012/0203677 A1 | 8/2012 | Raleigh |
| 2012/0208496 A1 | 8/2012 | Raleigh |
| 2012/0209750 A1 | 8/2012 | Raleigh |
| 2012/0210391 A1 | 8/2012 | Raleigh |
| 2012/0214441 A1 | 8/2012 | Raleigh |
| 2014/0181267 A1* | 6/2014 | Wadkins et al. ...... H04L 69/163 709/219 |

FOREIGN PATENT DOCUMENTS

| | | |
|---|---|---|
| WO | 01/17169 A2 | 3/2001 |
| WO | 01/17313 A1 | 3/2001 |
| WO | 01/46846 A2 | 6/2001 |
| WO | 01/46889 A2 | 6/2001 |
| WO | 2010/088072 A1 | 8/2010 |
| WO | 2010/088073 A1 | 8/2010 |
| WO | 2010/088074 A1 | 8/2010 |
| WO | 2010/088075 A1 | 8/2010 |
| WO | 2010/088076 A1 | 8/2010 |
| WO | 2010/088080 A1 | 8/2010 |
| WO | 2010/088081 A1 | 8/2010 |
| WO | 2010/088082 A1 | 8/2010 |
| WO | 2010/088083 A1 | 8/2010 |
| WO | 2010/088085 A1 | 8/2010 |
| WO | 2010/088086 A1 | 8/2010 |
| WO | 2010/088087 A1 | 8/2010 |
| WO | 2010/088094 A1 | 8/2010 |
| WO | 2010/088095 A1 | 8/2010 |
| WO | 2010/088096 A1 | 8/2010 |
| WO | 2010/088097 A1 | 8/2010 |
| WO | 2010/088098 A1 | 8/2010 |
| WO | 2010/088100 A1 | 8/2010 |
| WO | 2010/088101 A1 | 8/2010 |
| WO | 2011/053858 A1 | 5/2011 |

* cited by examiner

SYSTEM, METHOD, AND COMPUTER PROGRAM FOR MANAGING SECURITY IN A NETWORK FUNCTION VIRTUALIZATION (NFV) BASED COMMUNICATION NETWORK

CLAIM OF PRIORITY AND RELATED APPLICATIONS

This application claims the benefit of: U.S. Provisional Application No. 61/918,597, filed Dec. 19, 2013; U.S. Provisional Application No. 61/941,380, filed Feb. 18, 2014; U.S. Provisional Application No. 61/981,116, filed Apr. 17, 2014; U.S. Provisional Application No. 62/026,508, filed Jul. 18, 2014; and U.S. Provisional Application No. 62/027,709, filed Jul. 22, 2014, the entire contents of which are incorporated herein by reference.

FIELD OF THE INVENTION

The present invention relates to telecommunications and/or data communications and, more particularly to network function virtualization (NFV) of telecommunications networks.

BACKGROUND

Network Function Virtualization is a term or a name of a proposed architecture of telecom services as published by the European Telecommunications Standards Institute (ETSI) in a series of documents available from the ETSI website. NFV uses generic hardware platform and software adapted for the generic hardware platform. Thus, NFV creates a network much more flexible and dynamic than a legacy communication network. In NFV-based networks, —a Virtual Network Function (VNF) decouples the software implementation of the network function from the infrastructure resources it runs on by virtualization. A network service is based on one or more VNFs and/or Physical Network Functions (PNFs), their interconnections, and chaining definitions. The VNFs can be executed on almost any generic hardware processing facility. Therefore, VNFs may be installed, removed, and moved between hardware facilities, much more easily, less costly and thus, more frequently.

The flexibility of the NFV-based network enhances the means available for optimizing the network's capacity and performance. However, current techniques for providing network security in such networks are limited.

There is thus a need for addressing these and/or other issues associated with the prior art.

SUMMARY

A system, method, and computer program product are provided for providing security in a Network Function Virtualization based (NFV-based) communication network. In operation, a security attack is identified. Additionally, a first hardware unit attacked by the security attack is identified. Further, a hardware unit in which to initiate a security defense software program is identified. Moreover, the security defense software program is initiated in the identified hardware unit.

DETAILED DESCRIPTION

Figure 1:
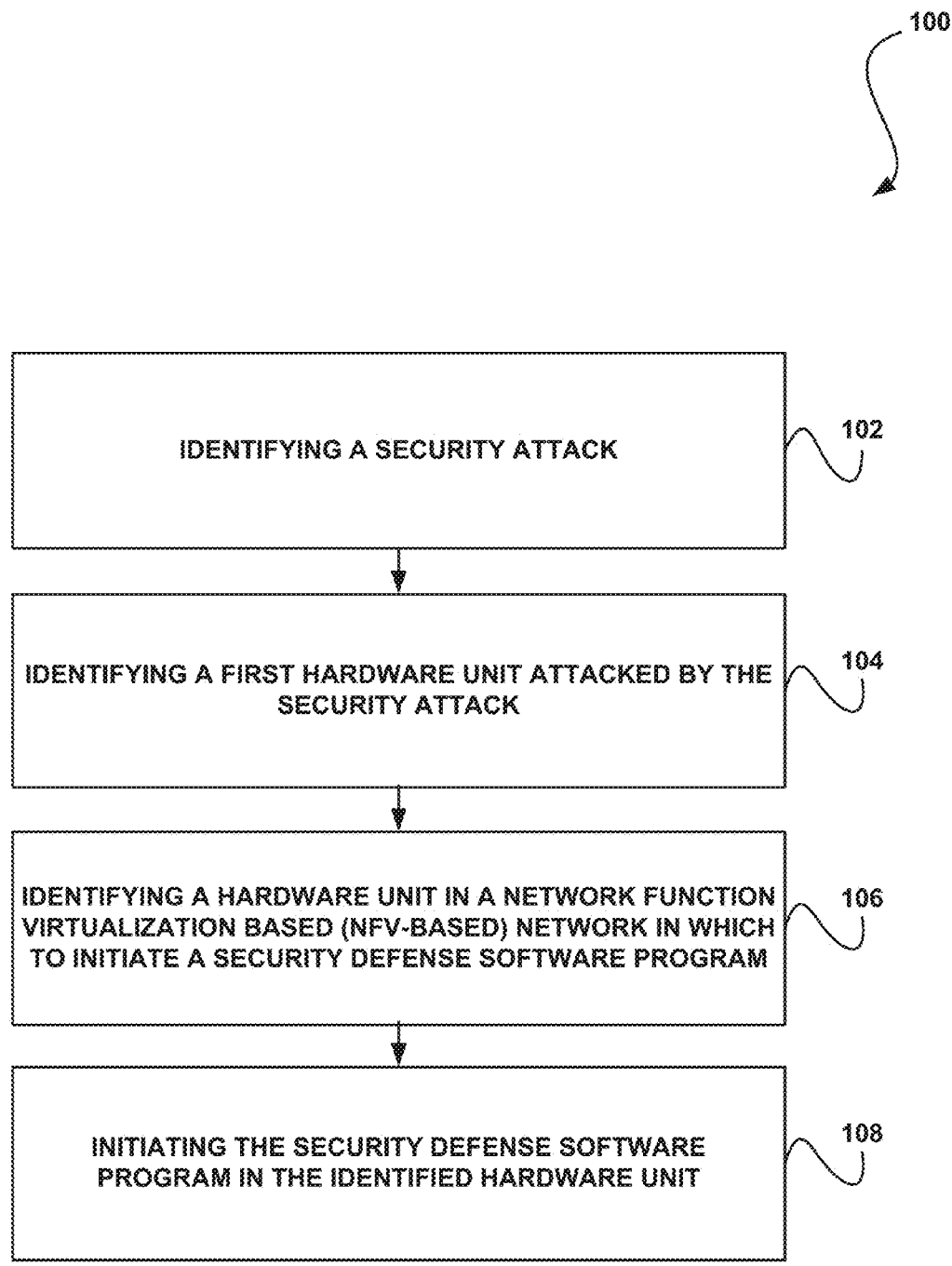
FIG. 1 illustrates a method for providing security in a Network Function Virtualization based (NFV-based) communication network, in accordance with one embodiment.

FIG. 1 illustrates a method 100 for providing security in a Network Function Virtualization based (NFV-based) communication network, in accordance with one embodiment.

In operation, a security attack is identified. See operation 102. The security attack may include any type of security attack.

Additionally, a first hardware unit attacked by the security attack is identified. See operation 104. Further, a hardware unit in which to initiate a security defense software program is identified. See operation 106.

Moreover, the security defense software program is initiated in the identified hardware unit. See operation 108. In one embodiment, the identified hardware unit in which to implement the security defense software program may include the first hardware unit. In another embodiment, the identified hardware unit to implement the security defense software program may include an alternative hardware unit.

In one embodiment, the method 100 may include: identifying a second hardware unit operative to replace the first hardware unit; migrating functionality of the first hardware unit to the second hardware unit; and initiating the security defense software program in the first hardware unit. In this case, the first hardware unit may be cleansed. Additionally, the functionality of the first hardware unit may be migrated from the second hardware unit back to the first hardware unit.

Further, in one embodiment, the method 100 may include: identifying a second hardware unit originating the security attack; identifying a third hardware unit communicatively located between the first hardware unit and the second hardware unit; and initiating a security defense software program in the third hardware unit. In this case, the method 100 may further comprise initiating the security defense software program in the third hardware unit, where the third hardware unit is physically located as close as possible to the second hardware unit. Furthermore, the security defense software program may be initiated in a plurality of the third hardware units to reduce load on each of the third hardware units.

Still yet, the method 100 may further include: setting a load threshold; measuring load in the third hardware unit; if the measurement of load in the third hardware unit is greater than the load threshold, identifying a fourth hardware unit communicatively located between the first hardware unit and the second hardware unit; and initiating a security defense software program in the fourth hardware units to reduce load on the third hardware unit.

In the context of the present description, the terms "network" and "communication network" refer to the hardware and software connecting one or more communication elements including wireline networks, wireless networks, and/or combinations thereof.

Further, a hardware unit may include any computing machine. The term computing machine relates to any type or combination of computing devices, or computing-related units, including, but not limited to, a processing device, a memory device, a storage device, and/or a communication device.

The terms "network function virtualization" (NFV) and virtual network function (NFV) are described in a series of documents published by the European Telecommunications Standards Institute (ETSI) and available from the ETSI website. The term "virtual network function or feature" (VNF) refers to a particular implementation of a function, a feature, or a service provided by the network, internally within the network, or externally to a customer, subscriber, end-user, a terminal or a server. A VNF may include the software program implementation of the function or feature or service. The term VNF instance (VNF-I) refers to a particular process or task executing the VNF program by a particular virtual machine or processor or computing facility and/or used by a particular customer (or subscriber, end-user, terminal or server, etc.).

The term "service" refers to any type of use (such as a use case) that a NFV-based communication network may offer or provide to one or more communication elements. A service may include switching data or content between any number of elements, providing content from a server to a communication element or between servers, securing and protecting communication and content, processing content provided by the customer or by a third party, providing backup and redundancy, etc. A service may be using partial functionality of a VNF or may include one or more VNFs and/or one or more VNF instances forming a service sub-network (or interconnection model). In the context of the present description, the term "chain" may refer to such service sub-network, such as a particular plurality of VNFs and/or VNF instances associated with a particular service type or a service instance.

The term "deployment", when referring to hardware elements, including processing elements, memory elements, storage elements, connectivity (communication) elements, etc., refer to the configuration or topology of these hardware elements creating the NFV-based network. The term "deployment", when referring to software elements, such a VNFs and VNF instances, refers to the association between such software elements and hardware elements.

The term "deployment optimizations" refers to association of software and hardware elements in a manner that satisfies a particular set of requirements and/or rules, such as load-related and performance-related requirements, or a manner that makes a better use of a particular hardware deployment, such as by reducing operational cost.

The terms "service deployment optimization", or "service optimization" or "chain optimization" refer to optimizing the deployment of a service chain, i.e., optimizing the deployment of one or more VNF instances making a particular service. The terms chain optimization and service optimization may thus be used interchangeably.

The term "session" refers to a communication connection between two or more entities that persists for a period of time during which data may be exchanged there between. A session may be implemented and managed by a session layer in the corresponding network protocol. The term session may include a network session and a logical session. The network session may be associated with the devices used to communicate, while the logical session may be associated with the communicating parties (users) and may persist regardless of the communication means that the parties are using.

The term "service continuity" includes and applies to the terms "session continuity" and "streaming continuity". Streaming refers to streaming media, session or service, such as sound (including voice), video, multimedia, animation, etc. The term service usually applies to a group of VNFs (or the functionality provided by the group of VNFs) but may also apply to a single VNF (or the functionality provided by the VNF). The term "continuity" indicates that the session or the service is not interrupted, or that an interruption is short enough that a user is not aware of such interruption, or that the interruption does not cause any loss of data, or that the loss is handled in acceptable manner (e.g. a few packets of speech lost, but the conversation can continue, etc.).

The term "availability" or "service availability" refers to a level of the service, or a characteristic of the service, in which the service provider should provide the service, albeit possible hardware or software faults. For example, the service provider may obligate to the customer to provide a particular level of processing power, communication features such as bandwidth, latency, and jitter, database consistency, etc. Such level or characteristic of the service should be available to the customer even when a hardware component or a software component providing the service do not function properly. Providing availability may therefore require additional resources such as backup resources and/or mirroring. Hence "availability" may also refer to the terms "fault recovery" and "redundancy".

The term "fault recovery" refers to the process of recovering one or more of the network's services, functions, and features after a fault, whether caused by a hardware malfunction, a system crash, a software bug or a security breech or fault. A hardware malfunction includes, but is not limited to, any type of inadequate performance associated with, for example, power supply, processing units, memory, storage, transmission line, etc. The term "fault recovery" also applies to recovering the functionality of one or more VNFs or VNF instances with respect to any of the above. The terms security breech or security fault may be used interchangeably.

The term "redundancy" refers to any type of component of the network that is fully or partly duplicated, provided in standby mode, or otherwise available, to replace another component of the network when that other component stops functioning properly or otherwise indicates some kind of fault. Redundancy may apply, but is not limited to, hardware, software, data and/or content.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

The principles and operation of a system, method, and computer program product for planning, preparing and managing security in NFV-based networks according to various embodiments may be further understood with reference to the following drawings and accompanying description.

Figure 2:
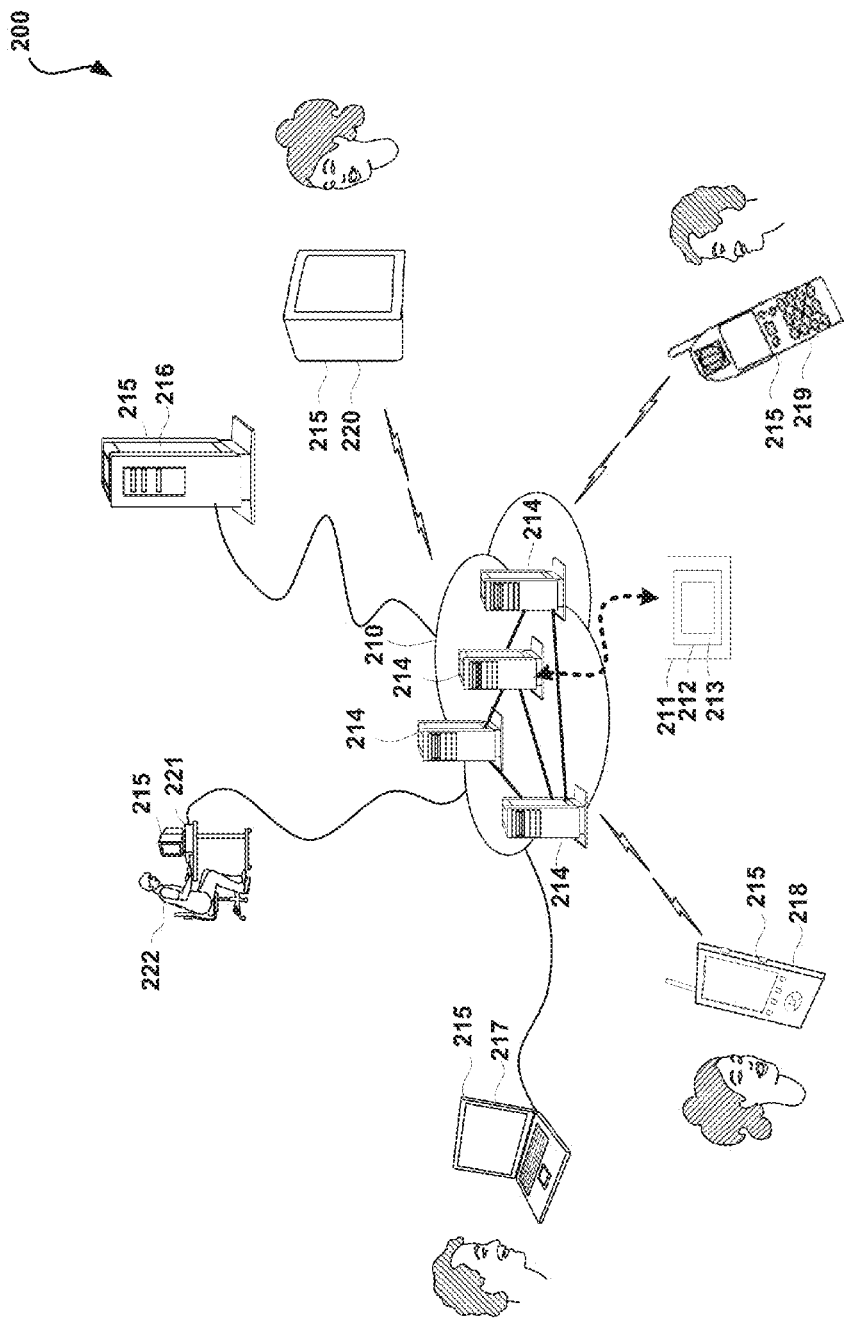
FIG. 2 illustrates a simplified diagram of a system associated with an NFV-based communication network, in accordance with one embodiment.

FIG. 2 illustrates a simplified diagram of a system 200 associated with an NFV-based communication network 210, in accordance with one embodiment. As an option, the system 200 may be implemented in the context of the details of FIG. 1. Of course, however, system 200 may be implemented in the context of any desired environment. Further, the aforementioned definitions may equally apply to the description below.

As shown in FIG. 2, at least one NFV-based network 210 is provided. The NFV-based communication network 210 includes an NFV management system 2111, an NFV-orchestration (NFV-O) module 212, and a security management module 213, according to one embodiment.

In the context of the present network architecture, the NFV-based network 210 may take any form including, but not limited to a telecommunications network, a local area network (LAN), a wireless network, a wide area network (WAN) such as the Internet, peer-to-peer network, cable network, etc. While only one network is shown, it should be understood that two or more similar or different NFV-based networks 210 may be provided.

The NFV-based network 210 may include one or more computation facilities 214, each including one or more hardware units and being interconnected by communication links to form the NFV-based network 210. At least one of the computation facilities 214 may include the NFV management system 211. The NFV management system 211 may include the NFV-O module 212 and the security management module 213.

The NFV-O module 212 may be executed by one or more processors, or servers, such as computation facilities 214, of the NFV-based network 210. The NFV-O module 212 may be executed as an NFV-O instance or component. The NFV-O module 212 may therefore include a plurality of NFV-O instances or components as will be further explained below.

The security management module 213 may be a part or a component of the NFV-O module 212. However, the security management module 213, the NFV-O module 212 and the NFV management system 211 may be separate software programs provided by different vendors. In one embodiment, the NFV-based network 210 may even have a plurality of any of the NFV management systems 211, the NFV-O modules 212, and/or the security management module 213.

A plurality of devices 215 are communicatively coupled to the NFV-based network 210. For example, a server computer 216 and a computer or terminal 217 may be coupled to the NFV-based network 210 for communication purposes. Such end-user computer or terminal 217 may include a desktop computer, a lap-top computer, a tablet computer, and/or any other type of logic or data processing device. Still yet, various other devices may be coupled to the NFV-based network 210 including a personal digital assistant (PDA) device 218, a mobile phone device 219, a television 220 (e.g. cable, aerial, mobile, or satellite television, etc.) 2, etc. These devices 215 may be owned and/or operated by end-users, subscribers and/or customers of the NFV-based network 210. Others of the devices 215, such as administration station 221, may be owned and/or operated by the operator of the NFV-based network 210.

A network administrator 222 may supervise at least some aspects of the operation of the NFV-based network 210 by controlling an NFV infrastructure including the NFV management system 211, the NFV-O 212, and the security management module 213.

Figure 3:
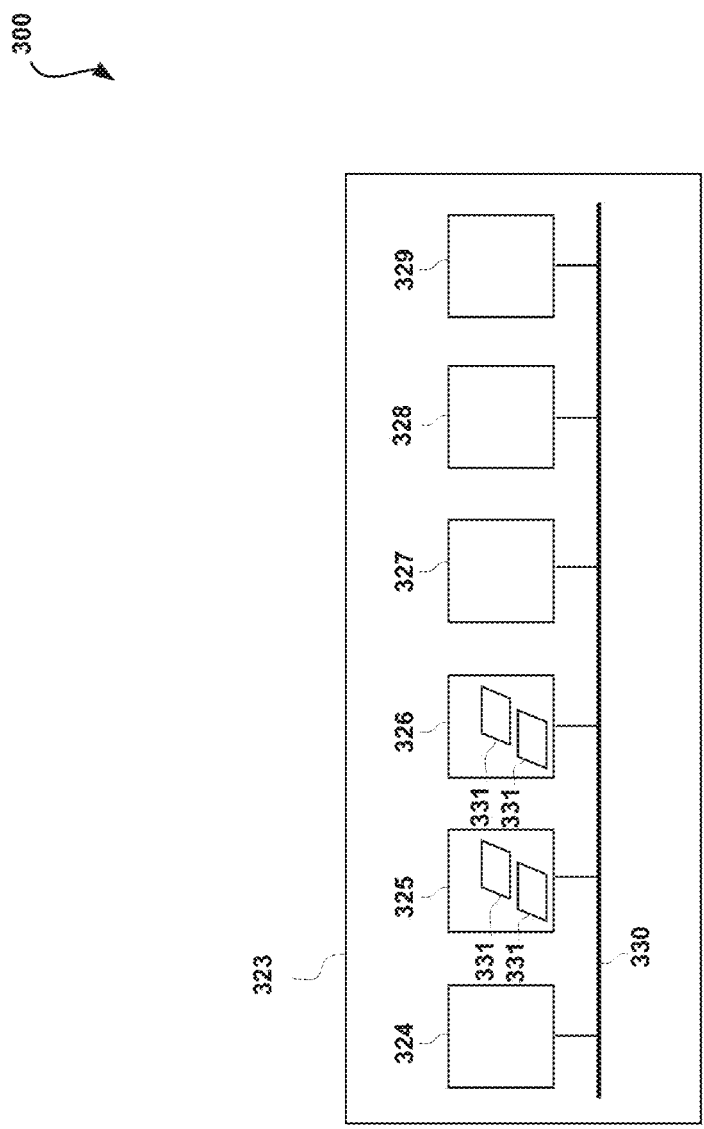
FIG. 3 illustrates a simplified block diagram of a hardware unit of an NFV-based network, in accordance with one embodiment.

FIG. 3 illustrates a simplified block diagram 300 of a hardware unit 323 of an NFV-based network, in accordance with one embodiment. As an option, the block diagram 300 may be viewed in the context of the details of the previous Figures. Of course, however, block diagram 300 may be viewed in the context of any desired environment. Further, the aforementioned definitions may equally apply to the description below.

In one embodiment, the hardware unit 323 may represent a computing facility 214 of FIG. 2, or a part of a computing facility 214. The hardware unit 323 may include a computing machine. The term computing machine relates to any type or combination of computing devices, or computing-related units, including, but not limited to, a processing device, a memory device, a storage device, and/or a communication device.

The hardware unit 323 may therefore be a network server, and the computing facility 214 may be a plurality of network servers, or a data-center, including cloud-based infrastructure. As an option, the hardware unit 323 may be implemented in the context of any of the devices of the NFV-based network 210 of FIG. 2 and/or FIG. 5 and in any desired communication environment.

Each hardware unit 323 (or computing machine, computing device, computing-related unit, and/or hardware component, etc.), including each communication link between such hardware units, may be associated with one or more performance type and a respective performance rating or value, where the hardware unit and/or communication link is operative to provide the performance value. Performance types are, for example, processing power, cash memory capacity, regular memory capacity (e.g. RAM, dynamic, or volatile memory, etc.), non-volatile memory (e.g. such as flash memory, etc.) capacity, storage capacity, power, cooling, bandwidth, bitrate, latency, jitter, bit error rate, and packet loss, etc. Virtual machines may run on top of the hardware unit 323 and a VNF may be run on one or more of such virtual machines.

The hardware unit 323 may be operative to provide computing infrastructure and resources for any type and/or instance of software component executed within the NFV-based network 210 of FIG. 2. In this regard, the hardware unit 323 may be operative to process any of the processes described herein, including but not limited to, any NFV-related software component and/or process. The hardware unit 323 is operative to process virtual network functions (VNFs), VNF instances, network function virtualization orchestration (NFV-O) software, modules and functions, data center management software, and/or cloud management systems (CMS), etc.

In various embodiments, the hardware unit 323 may include at least one processor unit 324, one or more memory units 325 (e.g. random access memory (RAM), a non-volatile memory such as a Flash memory, etc.), one or more storage units 326 (e.g. including a hard disk drive and/or a removable storage drive, representing a floppy disk drive, a magnetic tape drive, a compact disk drive, etc.), one or more communication units 327, one or more graphic processors 328 and displays 329, and one or more communication buses 330 connecting the various units/devices.

The hardware unit 323 may also include one or more computer programs 331, or computer control logic algorithms, which may be stored in any of the memory units 325 and/or storage units 326. Such computer programs, when executed, enable the hardware unit 323 to perform various functions (e.g. as set forth in the context of FIG. 1, etc.). The memory units 325 and/or the storage units 326 and/or any other storage are possible examples of tangible computer-readable media.

It is appreciated that computer program 331 may include any of the NFV management system 211, the NFV-O 212, and/or the security management module 213 of FIG. 2.

Figure 4:
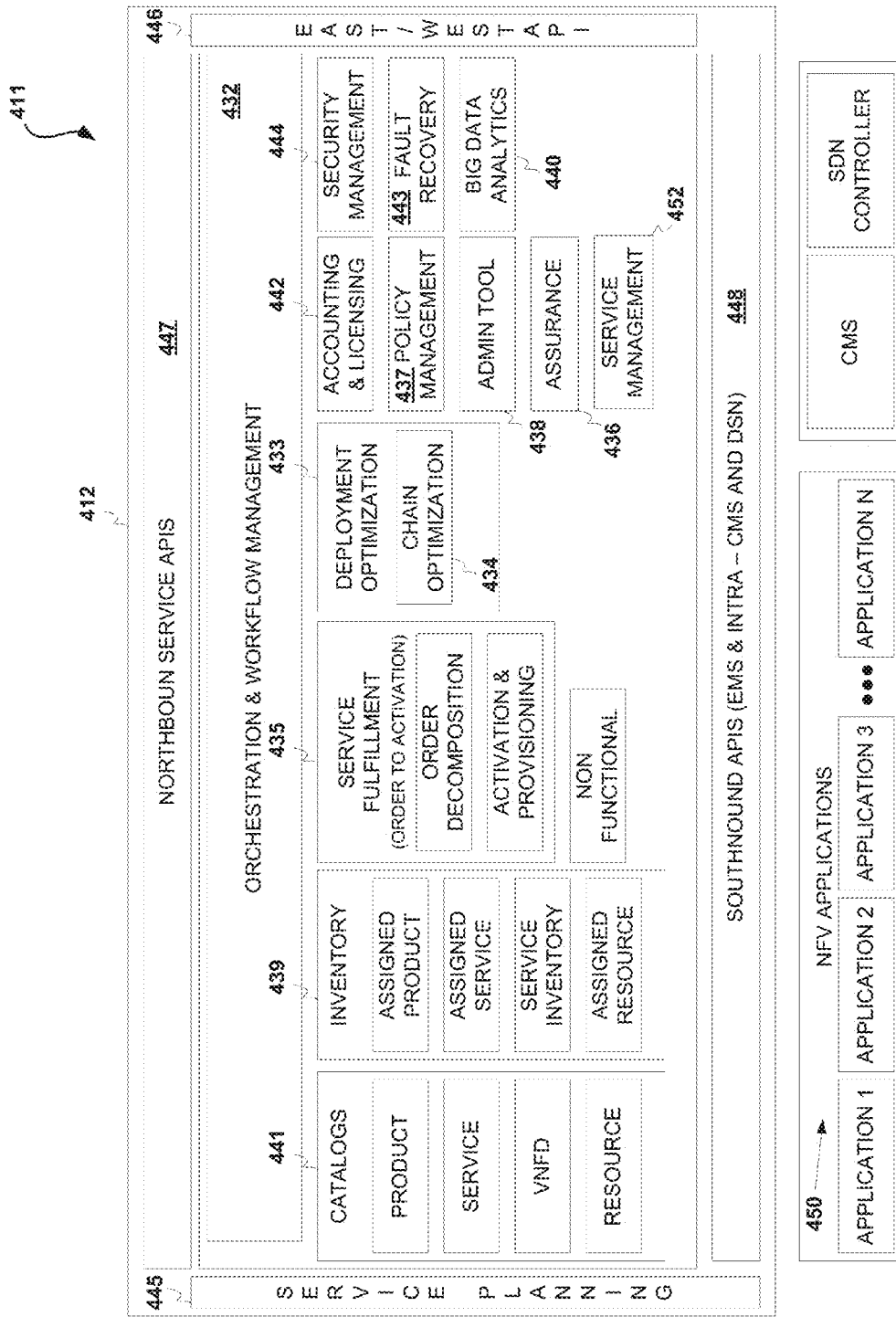
FIG. 4 illustrates a simplified diagram of an NFV management system, in accordance with one embodiment.

FIG. 4 illustrates a simplified diagram of an NFV management system 411, in accordance with one embodiment. As an option, the NFV management system 411 may be implemented in the context of the details of the previous Figures. For example, in one embodiment, the NFV management system 411 may represent the NFV management system 211 of FIG. 2. Of course, however, the NFV management system 411 may be implemented in the context of any desired environment. Further, the aforementioned definitions may equally apply to the description below.

In one embodiment, the NFV management system 411 may include an NFV-O module 412. The NFV management system 411 may include one or more NFV-O modules 412. In various embodiments, each of the NFV-O modules 412 may include orchestration and workflow management 432 that is responsible for managing (i.e. orchestrating) and executing all NFV-O processes, including inbound and/or outbound communication and interfaces.

The NFV management system 411 may include a deployment optimization module 433 that enables a user to devise automatic mechanisms for network optimizations. The deployment optimization module 433 may operate these mechanisms automatically and continuously to optimize the distribution of VNFs 450 and their VNF instances in real-time (or near-real-time) by migrating VNFs 450 and VNF instances (e.g. VNF instances 551 of FIG. 5, etc.) between hardware units (e.g. hardware units 551 of FIG. 5, etc.).

More information regarding possible processes and/or embodiments for performing optimization of VNF deployment as may be performed by deployment optimization module 433 may be found in U.S. Provisional Patent Application No. 61/941,380, titled "System, Method, And Computer Program For Managing Hierarchy and Optimization In A Network Function Virtualization (NFV) Based Communication Network", and U.S. patent application Ser. No. 14/572,719, titled "System, Method, And Computer Program For Managing Hierarchy and Optimization In A Network Function Virtualization (NFV) Based Communication Network", which are incorporated by reference herein in their entirety.

The NFV management system 411 may also include a chain optimization module 434. The chain optimization module 434 may be a part of deployment optimization module 433 and may enable a user to devise automatic mechanisms for optimizing the deployment of chains or groups of VNFs 450 and VNF instances. A service provided by an NFV-based network is typically made of a particular chain or group of particular VNFs 450 and their respective VNF instances. The chain optimization module 434 optimizes the deployment of chains or groups of services between hardware units according to the requirements and specifications associated with and/or adapted to the particular service, or chain, or a group.

The chain optimization module 434 may operate these mechanisms automatically and continuously to optimize in real-time the operation of chains or groups of the VNFs 450 and their VNF instances by re-planning their distribution among hardware units and optionally also by migrating the VNFs 450 and associated VNF instances between hardware units.

More information regarding possible processes and/or embodiments for performing migration of a group of VNFs and/or VNF instances (chain migration), such as by deployment optimization module 433, may be found in U.S. Provisional Patent Application No. 62/026,512, titled "System, Method, And Computer Program For Optimizing a Chain of Virtual Network Functions In A Network Based On Function Virtualization", and U.S. patent application Ser. No. 14/572,728, titled "System, Method, And Computer Program For Optimizing a Chain of Virtual Network Functions In A Network Based On Function Virtualization (NFV", which are incorporated by reference herein in their entirety.

The NFV management system 411 may also include a service fulfillment module 435 that manages service and resource (e.g. VNF) instance lifecycle activities as part of the process and orchestration activities. This may include on boarding, initiation (e.g. instantiation), installation and configuration, scaling, termination, software update (e.g. of a running VNF, etc.), test environment, and/or rollback procedure. Additionally, the service fulfillment module 435 may also provide decomposition of an order to multiple network services, and the activation of such network service as a single VNF instance, or as a chain of VNF instances.

Order decomposition includes translating business orders into a network oriented service implementation plan. For example, a business order may be decomposed into a plurality of functions, some of which may be provided by different software programs or modules (e.g. such as various VNFs) instantiated as a plurality of VNF instances across one or more data centers. Performing order decomposition, the service fulfillment module 435 may consult the deployment optimization module 433 for the best deployment option to customer order in a given network and resource condition. Performing order decomposition, the service fulfillment module 435 may then initiate the service including all its components. Order decomposition may be performed in several locations across an NFV-O hierarchy. For example, initial decomposition may be performed in the root of the NFV-O, and then further decomposition may be performed in the relevant data centers.

In one embodiment, an activation and provisioning module may provide the plan for activation and provisioning of the service to the orchestration and workflow management 432. The activation and provisioning module may also provide feedback on fulfillment status to an upper layer. This upper layer may include the business support services (BSS).

The NFV management system 411 may also include an assurance module 436 and a service management module 452 capable of gathering real time data on network elements' status and creating a consolidated view of services and network health. The assurance module 436 includes assurance functionality and may interact with the service management module 452 to perform assurance related lifecycle management procedures. Lifecycle management can be also triggered by other modules, policies, manual intervention, or from the VNFs themselves, etc. The assurance module 436 and the service management module 452 may also trigger events associated with lifecycle management and faults. The assurance module 436 and the service management module 452 may monitor the health of the network and may execute fault recovery activities.

The assurance module 436 and the service management module 452 provide the ability to monitor services' status and performance according to the required criteria. The assurance module 436 and the service management module 452 may also interact with the network infrastructure (e.g. including computing, storage, and networking, etc.) to receive the required information, analyze the information, and act upon each incident according to the defined policy. The assurance module 436 and the service management module 452 are able to interact with analytics to enrich a policy assurance module. Interfaces may also be provided for implementation by an external system.

The NFV management system 411 may also include a policy management module 437 that enables a user to define and configure offline and/or real-time policy for controlling VNF and service related rules. The policy management module 437 may contain the preconfigured policies and activities as well as selection rules for the NFV-O process to determine the preferred policy or activity to be performed for a particular process event. The policy management may be multi-layered, including vendor policy, service policy, and operator policy, etc. The policy mechanism may trigger the suitable policy layer (vendor/service/operator).

The NFV management system 411 may also include an administration module 438 that provides an overall view of the network, manual lifecycle management and intervention, and manual system administration and configuration. The administration module 438 may be operable to enable a user such as an administrator (e.g. administrator 222 of FIG. 2, etc.) to manage, view, and operate the NFV-O system. The administration module 438 may also provide a view of the network topology and services, the ability to perform specific activities such as manual lifecycle management, and changing service and connectivity configuration.

The NFV management system 411 may also include an inventory management module 439 that maintains a distributed view of deployed services and hardware resources. Inventory catalogues may reflect the current instantiation and allocation of the resources and services within the network mapped into products and/or customer entities.

The NFV management system 411 may also include a big data analytics module 440 that analyzes network and service data to support network decisions involving services and subscribers to improve network performance based on actual usage patterns. The big data analytics module 440 may also generate what-if scenarios to support business-oriented planning processes. Additionally, the big data analytics module 440 may function to analyze and evaluate the information for various planning aspects (e.g. Virtual Network Capacity Planning, Data Center Capacity Planning, Value based planning, Cost analysis for network deployment alternatives, etc.), deployment and management (e.g. Guided Operator Recommendations, What-if scenario analysis and simulation, application rapid elasticity and resource usage optimization, etc.), and may support business-oriented planning processes.

The NFV management system 411 may also include a catalog module 441 may include records defining various aspects of the network, such as products, services, and resources such as hardware units and VNFs (e.g. a VNF directory, etc.). The catalog module 441 may include a collection of centralized, hierarchical information repositories containing resource, service and product definitions with their relationship, versioning, and/or descriptors, etc. Such records may include templates enabling a user, such as an administrator, to define particular network components such as resources, products, services, etc. A resource template may define resources descriptors, attributes, activities, procedures, and/or connectivity, etc. A service template may define a service variation from resource building blocks. A product template may define parameters of a sellable product (e.g. prices, rating, etc.) based on service composition (e.g. in one embodiment, this may be part of a BSS catalogue).

The inventory management module 439, the big data analytics module 440, and/or the catalog module 441 may support multiple data centers, multiple CMSs and provide a centralized view across the infrastructure. The inventory management module 439, the big data analytics module 440, and/or the catalog module 441 may also support hybrid networks and services maintaining both physical and virtual resources.

The NFV management system 411 may also include an accounting and licensing module 442 that may be operable to record and manage network software usage data for commercial purposes including licensing, accounting, billing, and reconciliation of services with subscribers and providers. The accounting and licensing module 442 may manage licensing and usage of virtual network applications, including the ability to support complex rating schemes, based on various parameters such as CPU, memory, data, etc. The accounting and licensing module 442 may enable users to define the pricing of particular VNF modules and provide settlement with vendors. The accounting and licensing module 442 may also enable the evaluation of internal costs of services provided within the network for calculating return on investment (ROI).

The NFV management system 411 may also include a fault recovery module 443 (otherwise named disaster recovery planning module or DRP, etc.) that enables a user to plan and manage disaster recovery procedures for the NFV-O and/or the entire network.

More information regarding possible processes for managing fault recovery as may be embodied by fault recovery module 443 may be found in U.S. Provisional Patent Application No. 62/026,508, titled "System, Method, And Computer Program For Managing Fault recovery In A Network Function Virtualization (NFV) Based Communication Network", and U.S. patent application Ser. No. 14/572,726, titled "System, Method, And Computer Program For Managing Fault recovery In A Network Function Virtualization (NFV) Based Communication Network", which are incorporated by reference herein in their entirety.

The NFV management system 411 may also include a security management module 444 that provides the authentication authorization and accounting services of application security across the network. The security management module 444 may include, for example, an authentication module and function. In one embodiment, the authentication module and function (e.g. including identity management, etc.) may authenticate the identity of each user defined in the system. Each user may have a unique user identity and password. The system may support password based authentication with flexible password policy. Integration with external authentication providers may be done via additional system enhancements. The authorization module and function may support a role-based access control (RBAC) mechanism, where each user is assigned with one or more roles according to the business needs based on the least privileges concept (e.g. standard or administrator roles). In one embodiment, the accounting and licensing module 442 may provide an audit of security events such as authentication or login events.

As an option, the security management module 444 may use rules to protect sensitive information. For example, such rules may be used to ensure the data accessed is used for the specific purposes for which it was collected, sensitive information is encrypted when in storage/transit and masked/truncated on display and logs, and that the entire security system is deployed in the customer's intranet network (i.e. behind network/infrastructure measures), in an independent domain, etc.

Security is a major and essential issue in any communication network. An NFV-based network enables much more flexible and dynamic allocation of security functions and features, thus increasing the efficiency and resiliency of the network. The NFV management system 411, and particularly the security management module 444, are responsible for deploying security-related VNFs and VNF instances, managing the network's reaction to security hazards and threats as they develop, and managing the network's reaction to security breaches and security faults as they occur. It is appreciated that in this respect the NFV management system 411, and particularly the security management module 444, performs security related tasks continuously or repeatedly.

Accordingly, the security management module 444 may be operable for: identifying a security attack; identifying a first hardware unit attacked by the security attack; identifying a hardware unit in which to initiate a security defense software program; and initiating the security defense software program in the identified hardware unit. Moreover, the security management module 444 may be operable for implementing various functionality described in the context of FIG. 1, etc.

In one embodiment, the NFV management system 411 may further include a Secure Development Life Cycle (SDLC) module that ensures that security aspects are handled during a project's life cycle, such as security design, security testing, etc.

As shown further in FIG. 4, the NFV management system 411 may include a service planning module 445. The service planning module 445 may be used by a communication service provider (CSP) sales representative, enterprise, and/or technician, as part of selling engagement process with enterprise/SMB customers.

The service planning module 445 may also provide the ability to interact with catalogues, customer data, network and ordering systems to provide online network service proposals for the enterprise customers with ability to quote update the proposal, validate the serviceability and network inventory, and once done, provide the service order for activation using the northbound interface.

The NFV management system 411 may also include east/west APIs 446 that include various domains/activities interfaces, including an information source to a big data repository, and interaction capability with a physical network system (OSS).

Northbound APIs 447 provides application programming interfaces (APIs) to various external software packages, such as business support system (BSS) for service order fulfillment, cancel and update activities, status notification, resource inventory view, monitoring system, assurance system, service planning tool, administration tool for system view and configuration, and big data repository, etc.

Further, the southbound APIs 448 may provide APIs for external software packages, such as CMS (including service and VNFs lifecycle activities—receiving from the infrastructure status and monitoring information for upstream system and activities [e.g. assurance]), an SDN Controller (or other connectivity system) to configure inter and intra data center connectivity, an EMS to configure the VNF, and a VNF for a direct configuration.

Figure 5:
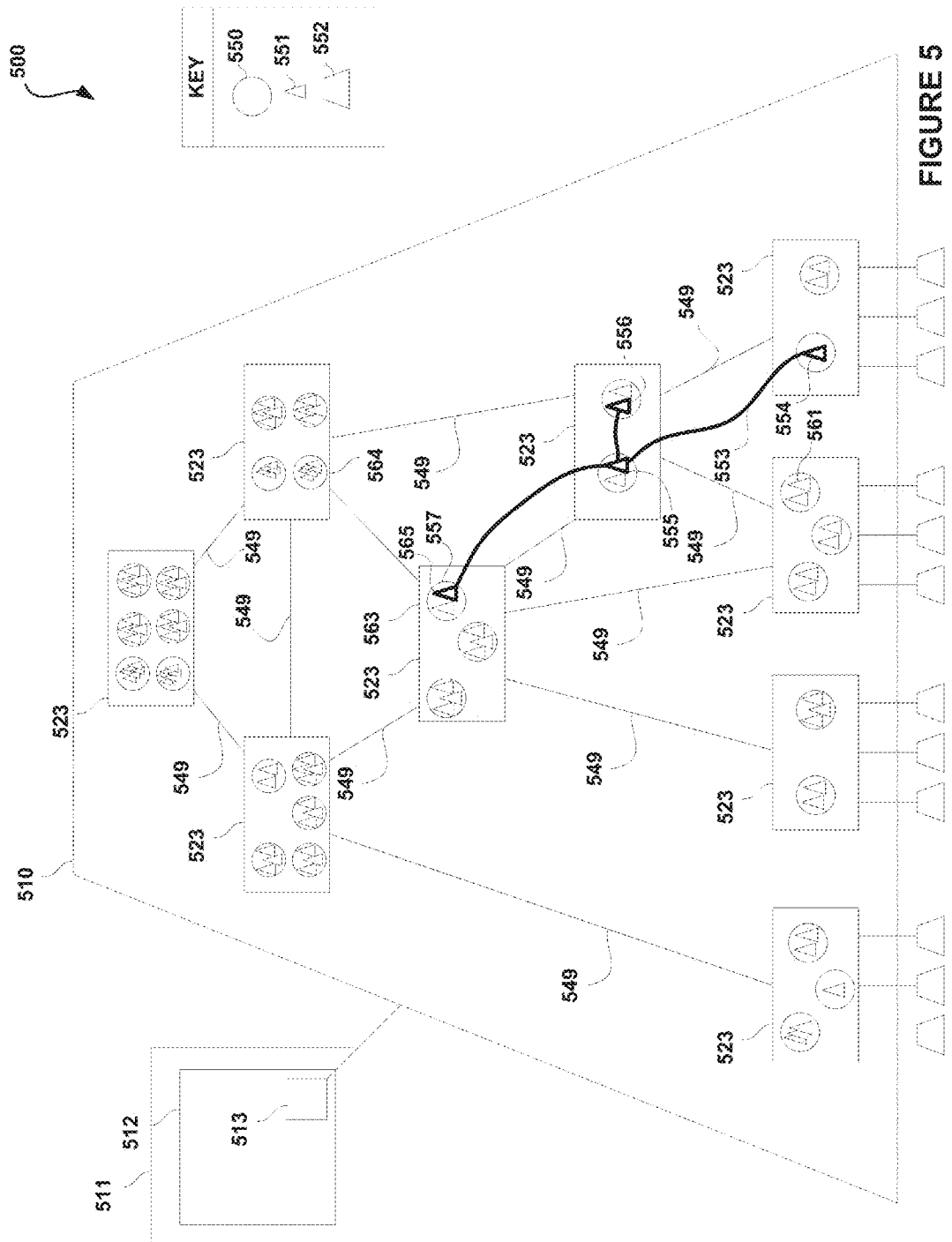
FIG. 5 illustrates a simplified diagram of a deployed NFV-based network, in accordance with one embodiment.

FIG. 5 illustrates a simplified diagram 500 of a deployed NFV-based network 510, in accordance with one embodiment. As an option, the diagram 500 may be viewed in the context of the details of the previous Figures. For example, in one embodiment, the deployed NFV-based network 510 and associated elements may represent the NFV-based networks and associated elements described in the context of the previous Figures. Of course, however, the diagram 500 may be viewed in the context of any desired environment. Further, the aforementioned definitions may equally apply to the description below.

As shown in FIG. 5, the NFV-based network 510 may include hardware units 523 connected via transmission lines 549, and VNFs implemented as software programs 550 installed in hardware units 523. Some of the hardware units 523 may be directly connected to a customer. The customer may be a subscriber, an end-user, or an organization, represented herein as a terminal or a server 552, or a plurality of terminals and/or servers 552. The NFV-based network 510 may also include a NFV management system 511, an NFV-orchestration (NFV-O) 512, and a security management module 513 (which may all represent elements described in the context of the previous figures, etc.).

As shown further in FIG. 5, several, typically different, VNFs 550 may be installed in the same hardware unit 523. Additionally, the same VNF 550 may be installed in different hardware units 523.

A VNF 550 may be executed by a processor of the hardware unit 523 in the form of a VNF instance 551. Therefore, a particular VNF 550 installed in a particular hardware unit 523 may be "incarnated" in (e.g. initiated, executed as, etc.) any number of VNF instances 551. The VNF instances 551 may be independent of each other. Additionally, each VNF instance 551 may serve different terminals and/or servers 552. The NFV-based network 510 connects to and between communication terminal devices 552 that may be operated by one or more customers, subscribers, and/or end-users.

It is appreciated that a network operator may manage one or more services deployed in the customer's premises. Therefore, some of the hardware units 523 may reside within the premises of the network operator, while other hardware units 523 may reside in the customer's premises. Similarly, a server, such as server computer 216 of FIG. 2, may reside in the premises of the network operator or in the customer's premises. Consequently, when the network operator provides and/or manages one or more services for a customer's terminal devices 552 such as a server computer, the NFV-based network 510 of the network operator may directly manage the VNFs 550, providing the services and their VNF instances 551.

In such situation, the NFV-based network 510 may manage the services irrespectively of the location of the terminal devices 552 (e.g. the server computer 216, etc.), whether in the premises of the network operator or in the customer's premises. In other words, the NFV-based network 510 may be managing the VNFs 550 and the VNF instances 551 providing the services, as well as the terminal devices 552 (e.g. the server computer 216, etc.) being co-located within the same computing device (e.g. the hardware unit 523, etc.), whether in the premises of the network operator or in the customer's premises or in a commercial cloud or any other place.

A service provided by the communication network may be implemented using one or more VNFs. For example, the service may be a group, or a chain of interconnected VNFs. The VNFs making the group, or the service, may be installed and executed by a single processor, by several processors on the same rack, within several racks in the same data-center, or by processors distributed within two or more data-centers. In some cases, chain optimization may be employed by optimizing the deployment of a service in a communication network using network function virtualization, and to optimizing the deployment of a group, or a chain, of virtual network functions in the NFV-based network 510. Therefore, the term "chain optimization" refers to the planning and/or managing of the deployment of VNFs making a chain, or a group, of VNFs providing a particular service.

For example, FIG. 5 shows a first service 553, including the VNFs 550 and their respective VNF instances 554, 555, 556, and 557, and a thick line. In this example, the group or chain of the VNFs 550 making first service 553 are connected as a chain of VNFs 550. However, the VNFs 550 making a service may be connected in any conceivable form such as a star, tree-root, tree-branch, mesh, etc., including combinations thereof. It is noted that the VNFs 550 may be executed by two or more VNF instances 551, such as VNF 554.

The deployment of the group or chain of the VNFs 550 making the first service 553 is therefore limited by constraints such as the capacity of the communication link 549 bandwidth and/or latency (delay).

A VNF may have a list of requirements, or specifications, such as processing power, cash memory capacity, regular memory capacity (e.g. RAM, dynamic, or volatile memory, etc.), non-volatile memory (e.g. such as flash memory, etc.) capacity, storage capacity, power requirements, cooling requirements, etc. A particular VNF instance 551 providing a particular function (e.g. to a particular customer, entity, etc.) may have further requirements, or modified requirements, for example, associated with a particular quality of service (QoS) or service level agreement (SLA). Such requirements may include maximum latency or delay, average latency and maximum variance (latency jitter), maximal allowed packet loss, etc. Other requirements may include service availability, redundancy, backup, provisions for rollback and/or recovery, fault-tolerance, and/or fail-safe operation, etc.

A service made of a chain or a group of VNFs 550 and their VNF instances 551 may have a similar list of requirements, or specifications, covering the service as a whole. Therefore, such requirements, or specifications, may imply, affect, or include, requirements, or specifications, regarding communication links between the VNFs 550 and/or the VNF instances 551. Such requirements, or specifications, may include bandwidth, latency, bit-error rate, and/or packet loss, etc. Such communication requirements or specifications may further impose deployment limitations, or constraints, requiring particular VNFs 550 and/or VNF instances 551 to reside in the same data-center, or within the same rack, or even in the same computing device, for example, sharing memory or being executed by the same processor. Security measures may add further requirements, or specifications, such as co-location of some of the VNFs 550 and/or the VNF instances 551.

In the context of FIG. 5, the NFV-based network 510 has a hierarchical structure. There may be at least four aspects of the hierarchical structure of the NFV-based network 510. The networking or traffic aspect refers to the arrangement of the transmission lines between the hardware units 523. The processing aspect refers to the arrangement of the hardware units 523. The software aspect refers to the arrangement of the VNFs 550. The operational aspect refers to the arrangement of the VNF instances 551.

One aspect of the optimization process in an NFV-based network is that it may be based on real-time needs, rather than long-term, statistically anticipated, needs. One potential limitation on network reconfiguration in NFV-based networks is that network configuration does not result in a deterioration beyond acceptable level of any of the current services. The NFV deployment module (e.g. module 433 of FIG. 4, etc.) may function to enable and manage migration of services between the hardware units 523, the VNFs 550, and the VNF instances 551 in real-time, without affecting or with a minimal effect on the availability of a service, and while securing service and session continuity.

In the context of the current description, the term "continuous" means that the deployment optimization module and/or a chain optimization module (e.g. the chain optimization module 434 of FIG. 4, etc.) performs the relevant optimization task or process in run-time, or real-time, or online, or on-the-fly, or repetitively and without adversely affecting the network's functionality and its services.

Unlike a legacy network, the NFV-based network may have two topologies: the topology of the hardware devices, and the topology of the VNFs (the distribution of VNFs among the hardware devices). The topology of the hardware network is relatively stable, while the VNF topology can be optimized in real-time. Another benefit of the NFV-based network is that modifying the software topology (e.g. the distribution of VNFs among the hardware devices) is much less costly than any modification of the hardware topology. However, any modification of the network has its cost, including the cost of making such modification possible. Added cost may result from the need to process the modification of the topology and the re-distribution of VNF instances and to maintain excess resources for such purpose.

Thus, in some cases, it may be desired to localize the NFV-O 512, and particularly the deployment optimization processes associated with the deployment optimization module and the chain optimization module to reduce the cost, and simultaneously to secure the possibility to expand the scope of the network managed by these processes, if needed.

Figure 6:
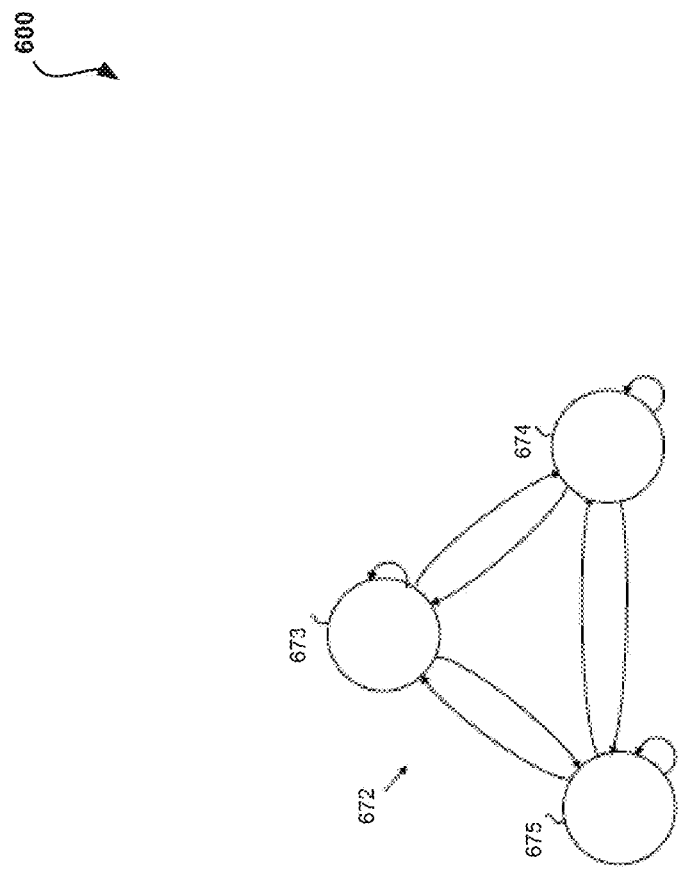
FIG. 6 illustrates a simplified block diagram of a process including an interaction between a deployment optimization module, a fault recovery module, and a security management module, in accordance with one embodiment.

FIG. 6 illustrates a simplified diagram 600 of a process including an interaction between a deployment optimization module, fault recovery module, and security management module, in accordance with one embodiment. As an option, the diagram 600 may be viewed in the context of the details of the previous figures. Of course, however, the diagram 600 may be viewed in the context of any desired environment. Further, the aforementioned definitions may equally apply to the description below.

To utilize efficiently the hierarchical structure and flexibility provided by the NFV architecture, an NFV-O may include process 672. This may include performing deployment optimization activities (process 673 executed by a deployment optimization module), including: continuous predictive analysis, thus providing continuous analysis of customer behavior and predicting customers' needs and the resulting network security requirements; continuously calculating optimization of the network's NFV configuration (i.e. the optimal deployment of VNF instances); considering resource conversion; and continuously migrating VNF instances along the network hierarchy to achieve the current, or near future, optimal deployment, while preserving service and/or session continuity.

The process 672 may also include performing security management activities (process 674 executed by the security management module), including: analyzing security risks and identifying possible security faults; planning recovery activities for each security fault, hardware unit, VNF, VNF instance, etc.; continuously monitoring the network security status, particularly regarding each of hardware unit, VNF, and VNF instance; and initiating a recovery activity as planned, upon detection of a security fault.

The process 672 may also optionally include, performing fault management activities (process 675 executed by the fault recovery module, regarding faults other than security-related faults), including: predictive maintenance; and fault recovery activities.

More information regarding possible processes for managing fault recovery as may be embodied by process 675 (and/or fault recovery module 443) may be found in U.S. Provisional Patent Application No. 62/026,508, titled "System, Method, And Computer Program For Managing Fault recovery In A Network Function Virtualization (NFV) Based Communication Network", and U.S. patent application Ser. No. 14/572,726, titled "System, Method, And Computer Program For Managing Fault recovery In A Network Function Virtualization (NFV) Based Communication Network", which are incorporated by reference herein in their entirety.

More information regarding possible processes for managing predictive maintenance, or preventive maintenance, as may be embodied process 675 may be found in U.S. Provisional Patent Application No. 61/918,597, titled "System, Method, And Computer Program For Preserving Service Continuity In A Network Function Virtualization (NFV) Based Communication Network", and U.S. patent application Ser. No. 14/572,716, titled "System, Method, And Computer Program For Preserving Service Continuity In A Network Function Virtualization (NFV) Based Communication Network", which are incorporated by reference herein in their entirety.

The recovery activities include the initiation and/or migration of VNF instances, and particularly security-related VNF instances within the network hierarchy to recover from the security fault, and/or improve the network performance regarding a security threat and/or breach. It is appreciated that such recovery activities include recovery activities performed in customer-premises equipment and software if the security of such customer-premises equipment and software is managed by the network and/or network operator.

It is also appreciated that the deployment optimization activities, the security management activities, and the fault management activities are performed continuously and concurrently, thus influencing each other. For example, if any of these processes changes the location of a VNF instance, this change requires the other processes to adapt.

The term "continuous" here means that the security management module performs the relevant task or process in run-time, or real-time, or online, or on-the-fly, or repetitively and without adversely affecting the network's functionality and its services.

As shown in FIG. 6, each of the processes 673, 674, and 675 updates, invokes, and influences the other processes as well the results of their processing, namely the deployment of VNFs and VNF instances, the deployment of backup or redundancy VNFs and VNF instances, as well as the plans for preventive maintenance, fault recovery and security recovery.

Figure 7:
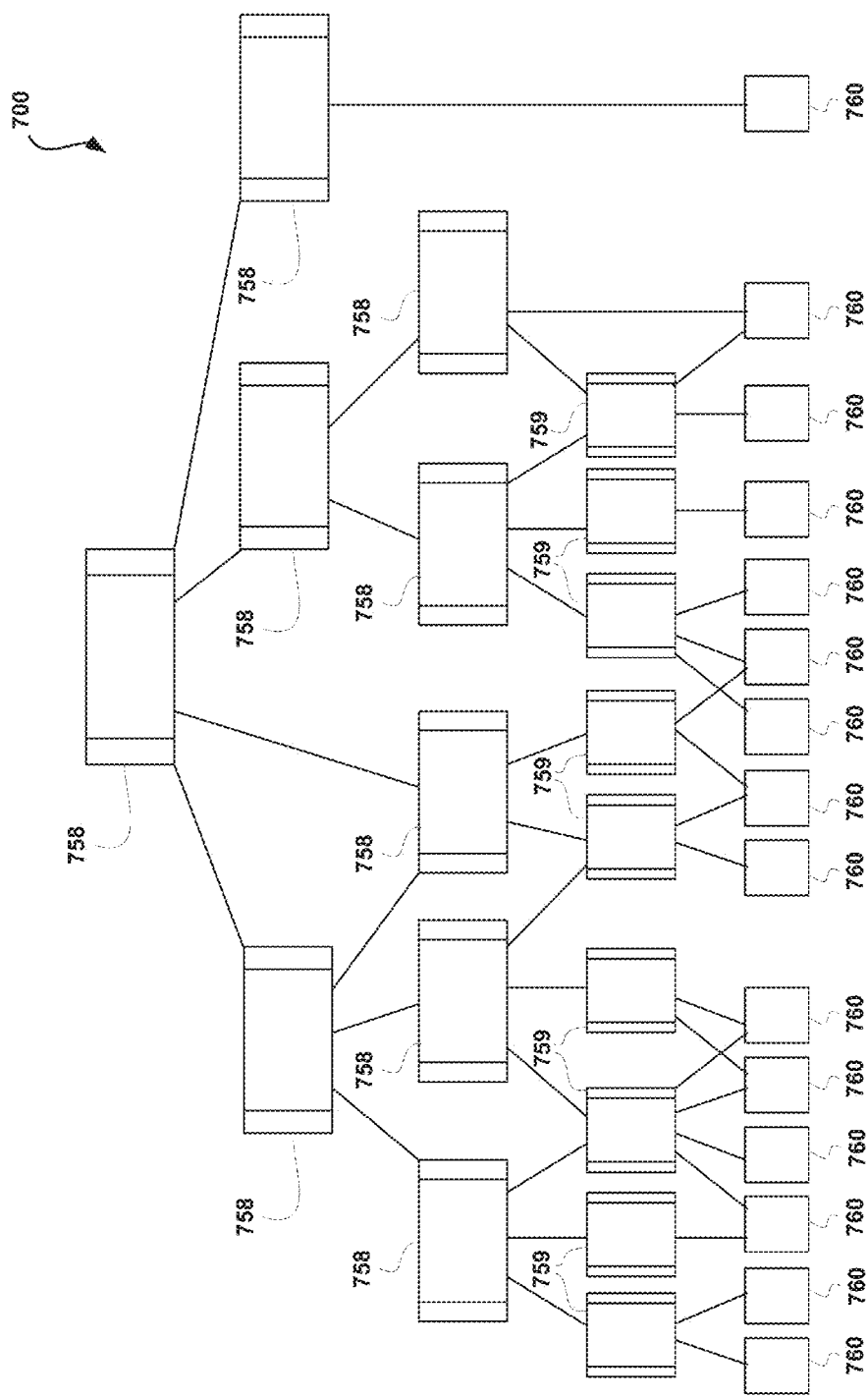
FIG. 7 illustrates a simplified block diagram of a distributed deployment of NFV-O, in accordance with one embodiment.

FIG. 7 illustrates a simplified diagram 700 of a distributed deployment of an NFV-O, in accordance with one embodiment. As an option, the diagram 700 may be viewed in the context of the details of the previous Figures. For example, in one embodiment, the distributed deployment of the NFV-O may represent the NFV-based networks and associated elements described in the context of the previous Figures. Of course, however, the diagram 700 may be viewed in the context of any desired environment. Further, the aforementioned definitions may equally apply to the description below.

The distributed architecture of an NFV-O enables faster response to local events on one hand, and improved scalability on the other hand. In a distributed NFV-O architecture, decision processes are performed in self-contained and local decision points, closer to the customer, and closer to the events (e.g. such as network or security faults, etc.).

The hierarchy of a distributed NFV-O can be viewed as a tree of two component types: a core component 758 and a leaf component 759. The NFV-O core component 758 can be a child of another core component 758, and/or a parent of one or more core components 758 or leaf components 759. A leaf component 759 cannot be a parent of a core component 758 or a leaf component 759.

Orchestration parameters managed by a particular leaf component 759 or core component 758 may be reported in real-time to the supervising (parent) core component 758. In addition to the supervision, this continuous updating process enables the supervising component to provide backup, and/or support recovery processes associated with hardware and/or software faults as well as security faults and/or breeches.

To provide redundancy, a leaf component 759 may be supervised by two or more core components 758, and child core components 758 may be supervised by two or more parent core components 758. The orchestration parameters managed by a particular core component 758 or leaf component 759 may also be mirrored to the backup core components 758. Optionally, the NFV-O core components 758 may have the same fully functional orchestration capabilities, while leaf components may be limited to simple, well defined and localized sub-orchestration tasks, and thus may provide a faster response to demands and changing load.

A cloud management system (CMS) 760 is a software package managing one or more hardware units operating one or more VNFs and executing one or more VNF instances. A CMS 760 can be managed by one or more leaf components 759 or core components 758, or combinations thereof. A CMS 760 can be located in the operator's premises or in the customer's premises or partly in both.

An NFV-O component such as a core components 758 or a leaf component 759 typically orchestrates a particular, predefined, territory. The territory may be one or more cloud management systems 760, one or more services, one or more customers, etc. Therefore, there can be an overlap between territories of different NFV-O components. For example, one NFV-O component may orchestrate a CMS 760, another NFV-O component may orchestrate a service that is at least partly provided by the same CMS 760, and additionally a third NFV-O component may orchestrate services for a particular customer connected to that same CMS 760.

As shown in FIG. 6, the deployment optimization by process 673, the fault recovery planning by process 675, and the security recovery planning by process 674, are executing interactively and continuously or repetitively, probably consuming processing power and other network resources. It is therefore advantageous to execute these processes, namely process 672, in a distributed manner. Distributed operation of process 672 and its components can be provided by using a distributed architecture of NFV-O as shown and described herein.

The distributed architecture of the NFV-O, and particularly, the distributed architecture of process 672 and its components enables faster response to local events on one hand, and improved scalability on the other hand. In a distributed NFV-O architecture, decision processes are performed in self-contained and local decision points, closer to the customer, and closer to the events (such as network or security faults).

Therefore, in cases such as a change of deployment, as effected by a user such as an administrator, or triggered by a fault event (which may be hardware related, software related or security related). The NFV-O component (leaf component or core component) closest to the affected entity may react by invoking a relevant process such as processes 673, 674 and 675 as described above with reference to process 672 of FIG. 6.

It is appreciated that invoking a fault recovery process may subsequently invoke one or more fault recovery planning processes. Invoking a deployment optimization process may subsequently invoke a process of redeployment. And invoking a security management process 674 may subsequently invoke a deployment optimization process and/or a fault recovery planning processes.

If, for any reason, the first responder NFV-O component cannot resolve the problem, for example, for lack of adequate or sufficient resources within the territory of the particular NFV-O component, the problem may be escalated above to the supervising or parent NFV-O component.

The NFV-O is a central component of the network as a system and thus may present a risk from a security perspective. For example, an attack against the NFV-O may result in a total network outage. Securing the NFV-O is therefore a goal and a challenge. A distributed NFV-O architecture enhances the network resilience/endurance. When an attack on a particular instance of the NFV-O is detected the NFV-O instance may be isolated and its functionality may be transferred to one or more other NFV-O instances.

Another aspect of the NFV-O hierarchy is stratified granularity, or resolution, of the orchestration process. An NFV-based network may include a very large number of hardware elements (e.g. processors, memory units, storage units, communication links, etc.) and an even larger number of VNFs and VNF-instances. Each of the VNF-instances may have a number of requirements (e.g. such as processing power, memory size, storage size, communication bandwidth, latency and jitter, etc.). Each of these hardware elements and software modules may produce a number of load values (e.g. corresponding to their respective requirements).

All of this creates a large amount of data that should be processed continuously or repeatedly to determine possible adverse conditions (e.g. a particular overload) or a potential cost saving situation. Such situation may require deployment optimization (e.g. the planning of a newly optimized deployment of VNF-instances) and redeployment (e.g. implementing the optimized deployment). The NFV-O hierarchy enables scalability of the redeployment optimization process by distributing the process in a hierarchical manner.

One optional aspect of hierarchical deployment optimization is that higher levels in the NFV-O hierarchy processes deployment optimization in a coarser granularity (or resolution), while lower levels in the NFV-O hierarchy processes deployment optimization in a finer granularity (or resolution).

For example, while a leaf component 759 manages its part (territory) of the NFV-based network in terms of particular hardware elements (e.g. processors, memory units, storage units, communication links, etc.) and software elements (e.g. VNFs and VNF-instances), a core component may manage its part (territory) of the NFV-based network in terms of whole subordinate (child) core components 758 or leaf components 759 it supervises. Thus, such parent core component 758 may perform deployment optimization in terms of requirements and load values applied to whole subordinate (child) core components 758 or leaf components 759.

A customer may use the services of several telecom operators. For example, the customer may be an international company operating in several countries. Such a customer usually establishes a virtual private network (VPN) across this plurality of telecom operators. Considering that these operators now operate NFV-based networks, the customer may establish a service including a plurality of VNFs, where different VNFs are part of different networks. Managing such inter-operator VNF-chains, or services, requires tight coordination across different NFV-based networks.

Such coordination can be implemented using various techniques. For example, the coordination may be implemented by enabling tight coordination between NFV-Os of the different NFV-based networks. As another example, the coordination may be implemented by establishing an inter-network NFV-O module that manages one or more inter-network VNF-chains, or services of a particular customer.

Optionally, such inter-network NFV-O may supervise two or more child or leaf NFV-O modules, each within a particular NFV-based network incorporating an NFV participating in the particular VNF-chain or service. It is appreciated that NFV-Os of different operators may be provided by different NFV-O vendors.

In a first network configuration a single NFV-O module may manage the deployment of VNFs and VNF instances throughout the entire NFV-based network. A deployment optimization module (e.g. and a chain optimization module) of the NFV-O module may continuously investigate the development of loads and provide alternative deployment plans. Consequently, the NFV-O module may redeploy VNFs and VNF instances and reallocate network resources accordingly.

Deployment optimization is indicated when one part of the NFV-based network is over-loaded (or approaches an overload situation) while another part of NFV-based network is relatively idle. The redeployment migrates some of the network entities (e.g. VNFs and VNF instances) from the overloaded part of NFV-based network to the relatively idle part of the NFV-based network to free resources where needed mostly. Therefore, the deployment optimization and redeployment activities may follow the changes of load distribution.

It is appreciated that the NFV-O is responsible for deploying and managing the VFNs and VNF instances providing the required security services. Particularly an instance of NFV-O, such as modules 758 or 759 of FIG. 7 deploy and manage the VFNs, and initiate VNF instances, as described above. Particularly, deployment optimization module, security management module, and fault recovery module operating within process 672, including processes 673, 674, and 675 of FIG. 6.

Core components and leaf components may report security events and related information up the hierarchy at all levels to enable the entire network of the distributed NFV-O to gather security information and correlate the events and their data. The global knowledge of security threats is then reported down the hierarchy to child core components and leaf components to improve their ability to defend against security threats and repair damages locally. The global knowledge reported down the hierarchy to child and leaf components is typically provided as rules, or as pieces of executable code, typically processed by the security management module of the local core component (for example, as part of process 674 of FIG. 6).

It is therefore appreciated that each NFV-O, that is each component of the NFV-O hierarchy, such as each core component 758 and/or leaf component 759 of FIG. 7, may include a security management module 444, as well as a deployment optimization module 433 (and a chain optimization module 434), and a fault recovery module 443. Thus, each NFV-O component of the NFV-O hierarchy executes its own process 672, as well as its processes 673, 674, and 675.

Therefore, if a security event is confined to the territory (e.g., part of the NFV-based network) of a particular NFV-O component (for example, a leaf component), then that NFV-O component may take care of the security event (using its internal security management module 444 and process 672). If the security event crosses the border the territory of a particular NFV-O component then the processing of the security event may be delegated higher in the hierarchy to a parent component that supervises the entire scope of the security event. (e.g., territory, or part of the NFV-based network, affected by the security event). The parent NFV-O component may then delegate particular tasks to particular child (and/or leaf) NFV-O components down the NFV-O hierarchy. For example, to distribute the processing load and expedite the resolution of the security event.

It is appreciated that a particular security event may be detected and/or identified and/or located by one or more NFV-O components of a particular hierarchy, such as a geographical NFV-O hierarchy, a service NFV-O hierarchy, or a customer NFV-O hierarchy. If the security event is distributed over several NFV-O (leaf) components it may require delegating the process of detecting and/or identifying and/or locating the security event up and/or down the hierarchy. Thereafter, the resolution of the security event may be transferred to another NFV-O hierarchy. For example, the geographic NFV-O hierarchy may detect and/or identify and/or locate the security event and thereafter the service NFV-O hierarchy may resolve the security event.

Figure 8:
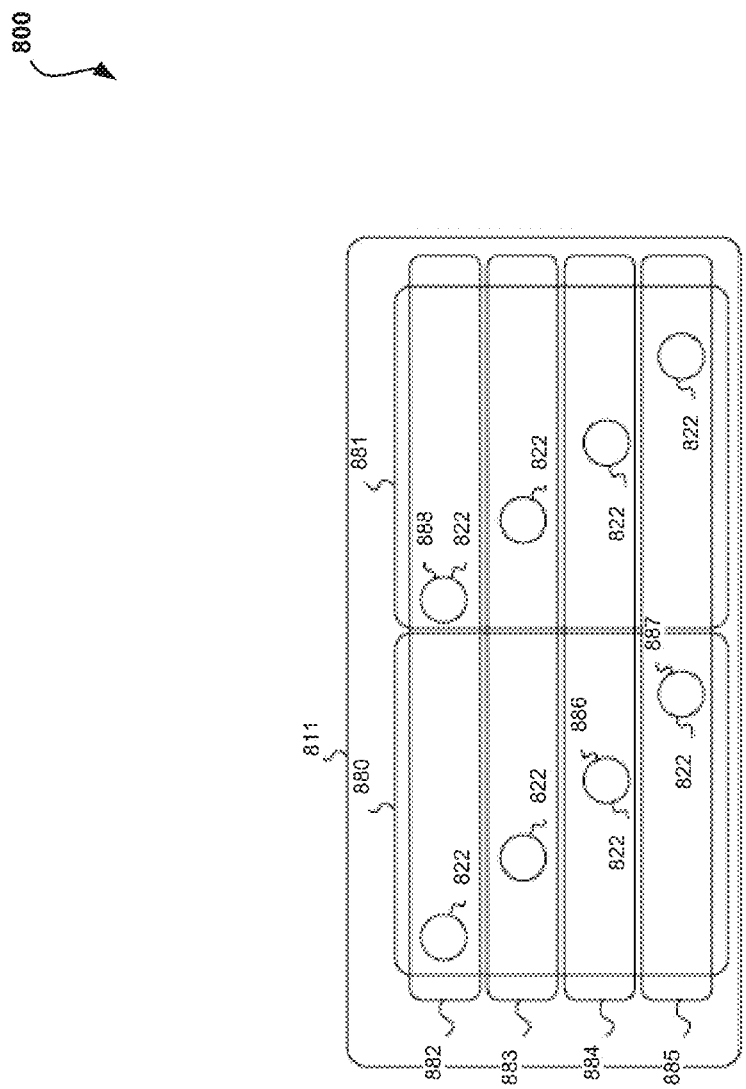
FIG. 8 illustrates a simplified block diagram of security management module, in accordance with one embodiment.

FIG. 8 illustrates a simplified diagram 800 of a of security management module, in accordance with one embodiment. As an option, the diagram 800 may be viewed in the context of the details of the previous Figures. Of course, however, the diagram 800 may be viewed in the context of any desired environment. Further, the aforementioned definitions may equally apply to the description below.

As shown in FIG. 8, security management module 811 includes the following groups of modules: one or more modules 880 managing the security of the network itself; one or more modules 881 managing security services provided to customers; one or more modules 882 managing access security (e.g. authentication and authorization); one or more modules 883 managing perimeter security (e.g. a firewall, etc.); one or more modules 884 managing system security (e.g. antivirus, etc.); and one or more modules 885 managing communication security (e.g. encryption, etc.).

Modules 880-885 are typically implemented as one or more VNFs 822. Such VNFs are then deployed in a network hardware unit and executed as one or more VNF instances. The VNF instance, or a group of VNF instances executing several VNFs, provide the required security service. Alternatively, the modules 880-885 may be implemented as part of an NFV-O, a core component, or a leaf component. For example, modules 880-885 of security management module 811 may be related to, or part of, security management modules 213, 444, and 513, of FIGS. 2, 3, and 5 respectively, and such modules may be implemented in each NFV-O component.

For example, a network system security module 886 may provide a security service protecting the system of a particular network entity. In this example, the network system security module 886 may protect the operating systems, NFV modules, and VNF instances in a particular hardware unit. The network system security module 886 is typically operating in the hardware unit as one or more VNF instances. One or more of the VNF instances may protect the network system against hacking while other VNF instances may perform procedures for recovery from security breaches when needed. In this respect, a security breach can be regarded as a network failure applying mechanisms of preventive maintenance and fault recovery to security threats and breaches.

For example, network communication security module 887 may provide protection of the communication between components of the NFV-based network and particularly components (modules) of the NFV-O, that is, the communication affecting the network management (and not the communication provided as a service). For example, this may include: securing NFV-O-related communication against hacking, for example, using encryption, sender authentication, etc.; using secure NFV-O communication as a means for providing and securing services such as access security, perimeter security and system security; and using secure NFV-O communication to monitor and verify health of NFV modules, operating systems, and VNF instances.

In this respect, the combination of VNF instances executing the network system security module 886 and VNF instances executing the network communication security module 887 secure the network of servers as an integrated system rather than a collection of independent units.

Similar modules, VNFs and VNF instances provide security services for customers, typically operating in a CMS and/or in customer premises equipment.

For example, customer access security module 888 may provide access security for a particular customer. For example, the customer access security module 888 may manage the authentication and authorizations of particular employees of the particular customer and verify that any access to any VNF 822 and/or VNF instance providing service to the particular customer is authenticated and authorized.

The customer access security module 888 provides a common access to all the applications servicing the particular customer and implemented as VNFs and/or VNF instances. This common access provides a single point of access to all the applications/VNFs/VNF instances. Users authorized by the particular customer can use the same user-ID and password to access all the applications irrespective of their embodiment as a collection or combination of VNFs and/or VNF instances. Thus, users of the particular customer may have a similar user experience with all the applications servicing the particular user.

As shown in FIG. 8, the customer access security module 888 is provided as a VNF of the NFV-based network. The common-access VNF is programmable to connect to any plurality of VNF-based applications as required by the particular customer. The common-access VNF (e.g., customer access security module 888) is also programmable to provide a user experience as perceived by the particular customer.

The common-access VNF is further programmable to connect to one or more security services for authentication, authorization, secured communication (encryption), etc. The authentication and authorization server may reside in the customer's premises.

For example, customer communication security module 889 may secure the communication between VNFs and/or VNF instances providing services to a particular customer. This means that communication between VNF instances is secured independently of the deployment topology of the VNFs. For example, by encrypting the communication between VNF instances in a particular manner adapted to the needs of the particular customer.

The NFV-O is responsible for deploying and managing the VNFs and VNF instances providing the required security services. Particularly, an instance of NFV-O may deploy and manage the VNFs and initiate VNF instances as described above. Particularly, the deployment optimization module, the security management module, and the fault recovery module operating as a process.

Figure 9:
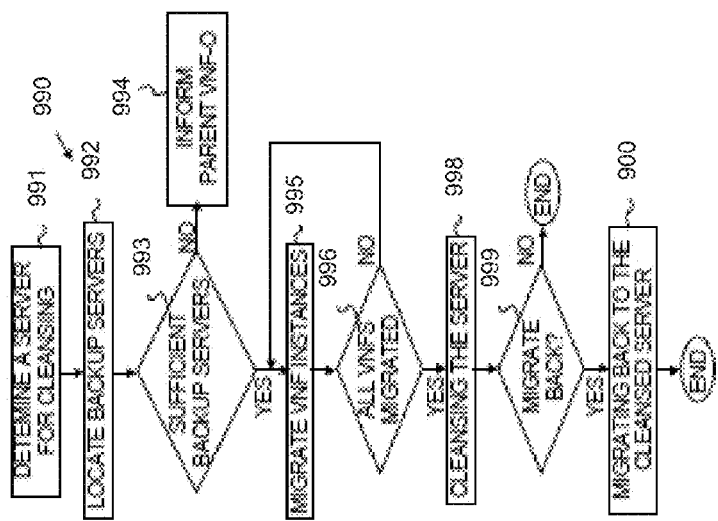
FIG. 9 illustrates a simplified flow chart of a security cleansing process, in accordance with one embodiment.

FIG. 9 illustrates a flow chart of a security cleansing process 990, in accordance with one embodiment. As an option, the flow chart may be viewed in the context of the details of the previous Figures. Of course, however, the flow chart may be viewed in the context of any desired environment. Further, the aforementioned definitions may equally apply to the description below.

System security requires periodical cleansing, requiring closing all the applications running on the particular server (i.e. hardware unit) being cleansed. Therefore, there is a need to migrate the applications, that is, the VNF instances and all the other software packages running in the particular server, for the time of cleansing. Thus, the NFV-O periodically selects one or more servers, migrates the VNF instances running on the server to other (backup) servers, and performs cleansing.

The security cleansing process 990 is an example of such system periodical cleansing. It is appreciated that a process such as process 990 may also be initiated by an NFV-O any time upon a detecting a relevant security event, receiving a security alert or alarm, identifying a security threat, etc.

The cleansing process 990 is typically implemented as one or more VNFs, and executed as one or more VNF instances, within the scope of a security management module of a particular NFV-O, possibly in coordination with a deployment optimization module, and a fault recovery module operating as a process. For example, the cleansing process 990 may operate in the scope of an NFV-O of a leaf component of a hierarchy. It is appreciated that the cleansing process 990 may also operate in the scope of an NFV-O of a core component of a hierarchy.

In this example, an NFV-O as a leaf component initiates the cleansing process 990 within a particular CMS. It is appreciated that such cleansing process 990 may be initiated or activated for any hardware unit managed and/or supervised within the scope of the NFV-based network, within the network premises and/or within the customer's premises.

For example, a cleansing process may include scanning for and removal of malicious software such as: anti-virus scan of a memory module, a particular storage facility, or an entire computing platform (e.g. a scan for malware, a scan for Trojan horse software, etc.).

A cleansing process may also include rebooting the system in a protected (safe) mode and scanning for malicious software, and reformatting one or more storage units and reinstalling relevant software programs (such as a VNF).

It is appreciated that such cleansing processes require extensive processing capacities and thus may adversely affect the ability of a particular processing unit to perform as planned. Thus, the cleansing process may require that the VNF instances active within the processing unit are migrated elsewhere.

The cleansing process 990 may start with step 991 to determine a processing facility for cleansing, for example a particular CMS or a particular server within a CMS. Proceeding to step 992, the cleansing process 990 allocates one or more backup servers adequate to receive VNF instances from the server to be cleansed. Such backup servers may be located within the same CMS or within another CMS supervised by the leaf component.

If cleansing process 990 cannot locate an adequate backup server (step 993) within its territory (the CMS units supervised by the leaf component), the cleansing process 990 sends an adequate message to a supervising (parent) core component (step 994) having a larger territory. In other words, if the local NFV-O cannot locate a backup server within its territory the process is transferred to a higher level (parent) NFV-O.

It is appreciated that if the first leaf component reports to its parent NFV-O that it failed to locate a backup resource within its territory, the parent NFV-O may execute the cleansing process itself within its larger territory. Alternatively, the parent NFV-O may instruct a second leaf component to provide an adequate resource to the first leaf component, and then instruct the first leaf component to execute the cleansing process using the additional resource. It is also appreciated that if the parent NFV-O also fails to locate an adequate backup resource it can further delegate the cleansing process upwards the hierarchy.

If sufficient backup servers are located, the cleansing process 990 may proceed to step 995, migrating all VNF Instances from the server to be cleansed (cleansed server) to the backup server(s). It is noted that the migration process does not involve moving code (software program) from the cleansed server to the backup server. Preferably the migration process does not involve moving data too. If needed, a new VNF code may be installed in the backup server and data may be provided from a mirroring site.

When all the VNF instances are migrated (step 996) from the cleansed server to the backup server(s), the process 990 may proceed to shut down all services in the cleansed server while preserving service continuity.

The process 990 may proceed to perform server cleansing in step 998, and thereafter, if migrating back is required (step 999), migrate VNF instances back to the cleansed server and renew the services (step 900). It is appreciated that optimization considerations, such as processed by a deployment optimization process, may affect the requirement to migrate back to the cleansed server.

The server cleansing step 998 typically includes any of the following procedures: cleansing VNFs, cleansing storage units, cleansing the operating system, and/or formatting the storage and installing the operating system and application software (VNFs).

Figure 10:
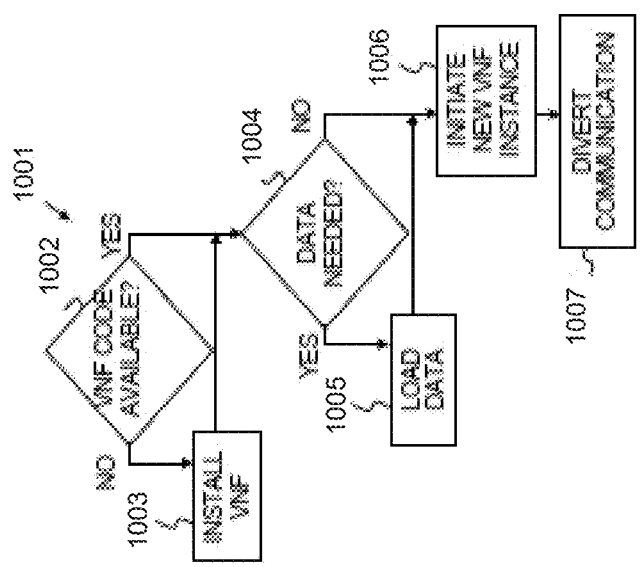
FIG. 10 illustrates a simplified flow chart of a VNF migrating routine, in accordance with one embodiment.

FIG. 10 illustrates a flow chart of a VNF migrating routine 1001, in accordance with one embodiment. As an option, the flow chart may be viewed in the context of the details of the previous Figures. Of course, however, the flow chart may be viewed in the context of any desired environment. Further, the aforementioned definitions may equally apply to the description below.

The VNF migrating routine 1001 applies to step 995 of FIG. 9, and optionally to step 900 of FIG. 9. The VNF migrating routine 1001 starts with step 1002 to determine if the required VNF code exists in the backup hardware unit. If the required VNF does not exists in the backup hardware unit, the VNF migrating routine of 1001 proceeds to step 1003 to install the required VNF in the backup hardware unit.

In step 1004, the VNF migrating routine 1001 determines whether the VNF in the backup hardware unit requires particular data to be able to take over and/or continue the processing of the migrating VNF instance without causing a session and/or service discontinuity. If such data is required, it is loaded in step 1005 from the migrating VNF instance, or from a mirroring facility, or from a backup facility, or from any other database managed by the VNF-O.

The VNF migrating routine 1001 then proceeds to step 1006 to initiate in the backup hardware unit a VNF instance and configure it according to the parameters of the VNF instance of the first hardware unit. The VNF migrating routine 1001 then proceeds to step 1007 to divert all or part of the communication incoming to the VNF instance of the faulty hardware unit to the VNF instance of the backup hardware unit.

More information regarding possible processes for migrating one or more VNF instance may be found in U.S. Provisional Patent Application No. 61/918,597, titled "System, Method, And Computer Program For Preserving Service Continuity In A Network Function Virtualization (NFV) Based Communication Network", and U.S. patent application Ser. No. 14/572,716, titled "System, Method, And Computer Program For Preserving Service Continuity In A Network Function Virtualization (NFV) Based Communication Network", which are incorporated by reference herein in their entirety.

It is appreciated that the contents of these two US patent applications may form at least a part of a possible embodiment of steps 995 and 900 of process 990 as described with reference to FIG. 9. It is appreciated that FIGS. 11 and 12 of U.S. patent application Ser. No. 14/572,716, titled "System, Method, And Computer Program For Preserving Service Continuity In A Network Function Virtualization (NFV) Based Communication Network" as well as their respective description, may be used instead of, or in addition to, FIG. 10 herein.

To provide resilience of the NFV-based network against hacking (e.g. a security breach) critical processes can require approval, confirmation and/or authorization from several different processes and/or servers. For example, a critical process may be divided between two or more VNFs and/or VNF instances. The VNF instances executing the process may be executed in different hardware units. The hardware units may be managed by different NFV-O instances. Hence, executing the critical process requires the cooperation of several VNF instances supervised by different security management modules. The distribution of a critical process between several VNF instances within different core components (or leaf component) increases the security of the network and particularly the immunity of the critical process against hacking.

In one embodiment, the security management module may include a network authentication module. A network entity, such as a VNF instance, receiving a communication (data, message, command, etc.) from another network entity (e.g. another VNF instance) can send the received communication or a part thereof to the network authentication module for authentication. Thus, the network authentication module may provide 3rd party authentication for data communicated between network entities such as VNF instances.

A receiver of a suspected communication can interrogate the network authentication module as to the authenticity of the sender of the communication as well as the particular communication. In case of a suspected breach, the network authentication module reports the breach to the security management module to take action. To further enhance network resilience, the network authentication module of use would be part of a security management module of a different NFV-O, such as a core component other than the core components or leaf components directly managing the communicating VNF instances.

Recovering from a security breach is initiated by the NFV-O in response to a reported or detected security breach.

Figure 11:
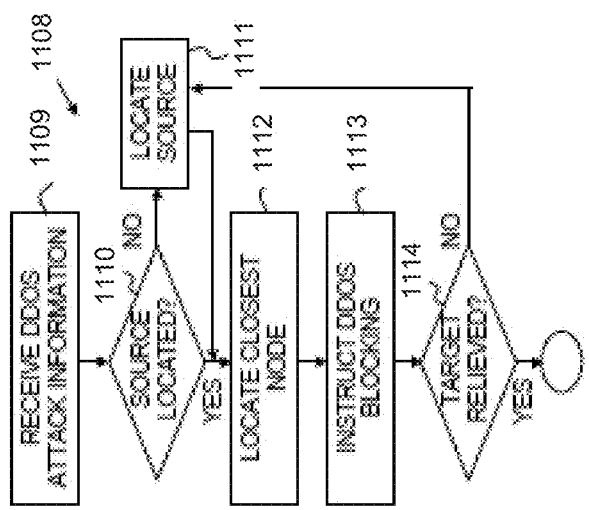
FIG. 11 illustrates a simplified flow diagram of a defense migration process, in accordance with one embodiment.

FIG. 11 illustrates a flow chart of a defense migration process 1108, in accordance with one embodiment. As an option, the flow chart may be viewed in the context of the details of the previous Figures. Of course, however, the flow chart may be viewed in the context of any desired environment. Further, the aforementioned definitions may equally apply to the description below.

Defense migration process 1108 refers to a security process performed by a security management module to deploy and/or advance the defense against a security attack in a manner that reduces the load on the network, and particularly, the load on the attacked entity (whether internal to the network or in a customer's premises).

A security breach such as distributed denial of service (DDoS) is usually identified at the victim and is therefore usually confronted at the victim or very close to the victim. However, the attack causing the security breach may be identified with a source, and it may be much more efficient to move the protection as close as possible to the source. Alternatively, the protection can be located at a central communication point (hub).

For example, suppose a security VNF instance within a hardware unit detects that a terminal is under a DDoS attack (or any similar security-related attack). A VNF instance may inform its supervising NFV-O, that is the security management module of the supervising core component or leaf component.

It is appreciated that the term NFV-O and security management module may refer to two or more NFV-O instances and their respective security management modules, such as two or more core component and/or leaf components of FIG. 7, etc. It is also appreciated that defense migration process 1108, as any other process of the security management module, may affect and interact with processes of an NFV deployment module and/or fault recovery module.

In this case, it is assumed that a single NFV-O and a single security management module are managing the entire network. However, if a network is managed by two or more core components or leaf components (NFV-O instances and corresponding security management modules) then some of the steps described herein may be executed by different core components or leaf components, or repeated by other core components or leaf components. Similarly, the process, or some of the steps described herein, may be delegated up the hierarchy to a parent NFV-O supervising all the elements involved. The parent NFV-O may then delegate the process, or some of the steps described herein, down the hierarchy to one or more supervised NFV-Os.

As shown in FIG. 11, defense migration process 1108 starts in step 1109 when the security management module receives an update of a security attack (e.g., a DDoS attack) in progress on a particular hardware unit and/or a particular VNF instance.

If the attack information received in step 1109 does not includes the IP address of a source terminal (step 1110), then defense migration process 1108 locates the source, or the direction from which the attack arrives (step 1111). The defense migration process 1108 proceeds to step 1112 to locate a hardware unit (node) closest to the source terminal.

The defense migration process 1108 then proceeds to step 1113 to instruct a security VNF instance in a hardware unit to stop the DDoS attack from the source terminal. If required, the defense migration process 1108 also initiates the VNF instance in another hardware unit, and, if required, also installs the VNF instance.

It is appreciated that this procedure also applies for a plurality of attacks, and/or a plurality of sources of such attacks, and/or a plurality of directions in which attacks are detected, as may be common with DDoS and similar security hazards.

In a common DDoS attack the targeted entity is attacked from many sources, which may frequently change. Therefore, the defense migration process 1108 may deploy a plurality of security VNF instances throughout the network and as close as possible to the sources. Other security VNF instances may be deployed in central nodes to intercept attacks from new sources. The defense migration process 1108 repeats steps 1111 to 1113 until the attacked entity is relieved from the attack (step 1114).

The security attack (DDoS attack) described above is presented as an attack on a terminal device, however, it is appreciated that such attack can be directed on any hardware unit or software of the network with the goal of affecting the network (rather than a terminal or a particular website thereof). The purpose of the DDoS attack is to cause an overload of a particular server to cause stoppage of a service provided by that server. Attacking a network node may therefore cause the stoppage of many services. Thus, the importance of diverting the attack from the targeted hardware unit or software, and reducing the load within the network. This defense mechanism distributes the load of processing DDoS requests among a larger number of servers being closer to the sources of the DDoS attack. Hence, the importance of the plurality of core components and leaf components, their hierarchical structure as well as their mesh (multi-supervisor) structure.

If a customer is geographically distributed and connects to the network in several places, the security services can be positioned respectively. The services can be centralized and all the communication may be channeled through the hub, or distributed closest to the client's terminals and servers. The latter option may decrease the traffic requirements but complicates the system and its management. The consideration where to locate the service may change according to the particular service.

For example, a geographically distributed customer may have a plurality of CMS and another, probably larger, plurality of terminals. The CMS and terminals may be grouped and a leaf component may be deployed and assigned to manage each group. A central core component may be deployed and assigned to manage the leaf components.

Optionally, two central core components may be deployed and assigned to provide redundancy. Other core components may be deployed and assigned as intermediating (child) core components. The central core components, child core components and leaf components deploy service VNF instances to provide the required services to the customer as well as security VNF instances to protect the VNF instances (and the hardware units and CMS running these VNF instances).

Particularly, an NFV deployment module, a security management module and/or fault recovery module of the respective core and leaf components deploy and manage the service VNF instances, the security VNF instances, backup facilities for these VNF instances, as well as recovery procedures where needed. The particular location of each VNF instance (service and/or security) is determined according to the actual usage and traffic for the particular customer, based on the agreed upon QoS and SLA.

It is appreciated that VNFs and VNF instances of a geographically distributed customer may be orchestrated by the customer's network (hierarchy) of NFV-O modules. That is to say that a hierarchy of NFV-O modules particular to the customer manages the VNFs and VNF instances serving the particular customer. Accordingly, the security management module of the customer's NFV-O hierarchy supervises security issues, threats, breaches, etc., associated with the particular customer as well as VNFs and VNF instances serving the customer. This enables the NFV-O to expedite defensive action ahead of the actual attack on some of the VNFs and VNF instances involved.

Similarly, geographically distributed service may be orchestrated by a network (hierarchy) of NFV-O modules associated with the service, particularly of a service serving a plurality of customers.

Figure 12:
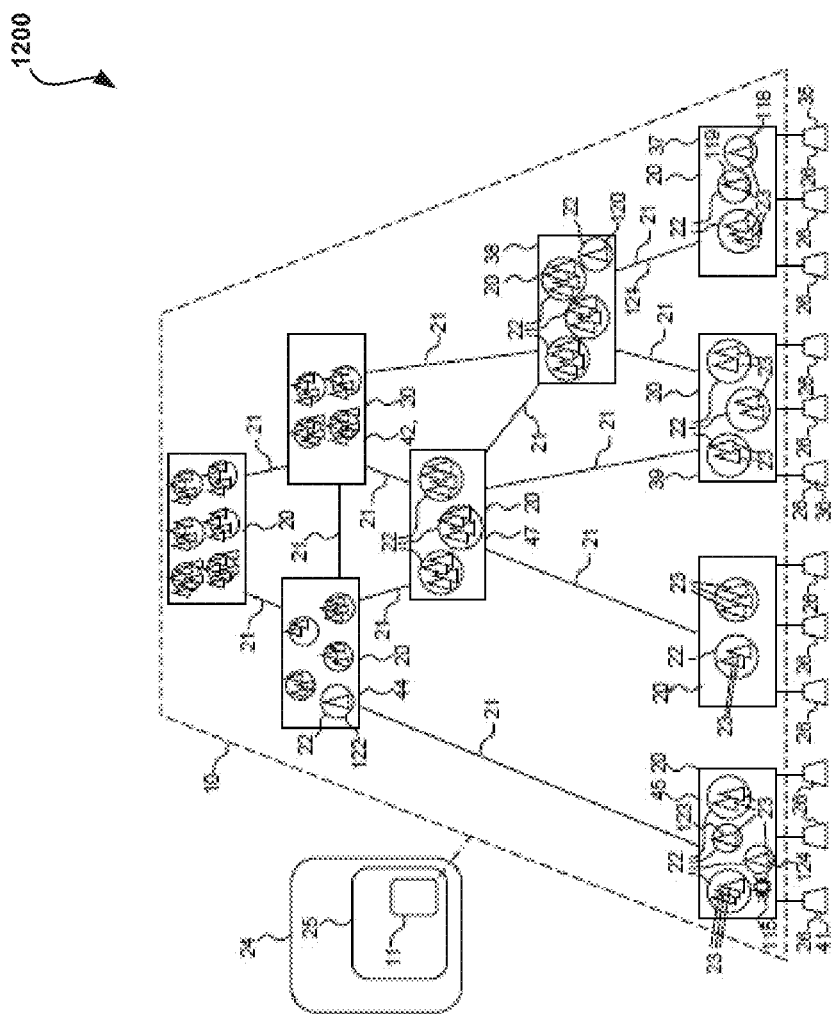
FIG. 12 illustrates a simplified illustration of an NFV-based Network defending against a DDoS attack, in accordance with one embodiment.

FIG. 12 illustrates a simplified diagram 1200 of an NFV-based network defending against a DDoS attack, in accordance with one embodiment. As an option, the flow chart may be viewed in the context of the details of the previous Figures. Of course, however, the flow chart may be viewed in the context of any desired environment. Further, the aforementioned definitions may equally apply to the description below.

It is appreciated that the term DDoS (distributed denial of service) is used here as an example of a remote security attack on any hardware unit or software program, whether part of NFV-based Network 10, hosted by NFV-based Network 10, or serviced by NFV-based Network 10.

In the exemplary security-related scenarios discussed below, hardware unit 37 is a data-center of a first customer (for example, a CMS) and hardware unit 45 is a data-center of a second customer (for example, also a CMS). However, it is appreciated that both hardware unit 37 and hardware unit 45 may reside in the same CMS. Any or both of hardware units 37 and 45 can be in the network's premises, or in the customer's premises, or distributed partly in the network's premises, and partly in the customer's premises. It is appreciated that hardware unit 45 may not even be of a customer known to NFV-based Network 10. It is appreciated that hardware unit 45 may be part of another communication network, and particularly another NFV-based Network 10.

More information regarding communication between various elements may be found in U.S. Provisional Patent Application No. 62/027,709, titled "SYSTEM, METHOD, AND COMPUTER PROGRAM FOR INTER-MODULE COMMUNICATION IN A NETWORK BASED ON NET- WORK FUNCTION VIRTUALIZATION (NFV)", and U.S. patent application Ser. No. 14/572,729, titled "SYSTEM, METHOD, AND COMPUTER PROGRAM FOR INTER-MODULE COMMUNICATION IN A NETWORK BASED ON NETWORK FUNCTION VIRTUALIZATION (NFV)", which are incorporated by reference herein in their entirety.

According to a first security-related scenario, a malicious software program 115 has been implanted in hardware unit 45 (e.g., by a third-party hostile entity). The malicious software program 115 is now attacking hardware unit 37. For example, the malicious software program 115 attacks one or more VNF instances 23 in hardware unit 37. For example, the attack may be a DDoS attack, but it can be any other type of security attack. The purpose of the DDoS attack is to load hardware unit 37 and/or the attacked VNF instances 23 to the point that it fails, or does not function properly, or functions too slow.

It is appreciated that in practice there is a large plurality of malicious software programs, residing in many hardware units (such as software program 115 in hardware unit 45), attacking one or more hardware units (such as hardware unit 37) and VNF instances. For the purpose of the security-related scenarios described below only one malicious software program in one hardware units (i.e., software program 115 in hardware unit 45) is considered.

According to the first scenario, a security VNF instance 23 designated by numeral 118 and operating in hardware unit 37 is monitoring hardware unit 37 for security hazards. It is appreciated that VNF instance 118 may operate externally to hardware unit 37 for example, in hardware unit 38.

According to the first scenario, VNF instance 118 detects the malicious attack on hardware unit 37 or any VNF instance 23 associated therewith. The security VNF instance 23 reports the attack to VNF-O 25, particularly to the immediate (local) core components or leaf component. The report may include details or characteristics of the attack, typically including identification of the source of the attack, such as IP address relating to hardware unit 45 or a software program thereof.

As a first optional action, a security VNF instance 23 operating in hardware unit 37 designated by numeral 119 that monitors the incomming communication now blocks communications from the hostile IP associated with hardware unit 45. This action may reduce the load from the attacked VNF instance 23 but the load on hardware unit 37 may persist.

As a second optional action, VNF-O 25 (or a core component or a leaf component), and/or security management module 11, may initiate one or more security VNF instances 23 upstream. In this context, the term "upstream" means between hardware unit 37 and hardware unit 45. For example, VNF-O 25 (or a core component or a leaf component) may initiate one or more security VNF instances 23 (designated by numeral 1203) in hardware unit 38, or in hardware unit 42 and 47. Such security VNF instances 23 operating in hardware units 38, 42 and/or 47 now block communications from the hostile IP associated with hardware unit 45. This action may reduce the load on the attacked hardware unit 37 (both the processing load and the traffic load on transmission line 21 designated by numeral 121). As many hardware units upstream are involved in blocking the malicious communications from hardware unit 45 the less each of them is affected as well as transmission lines 21 involved.

As a third optional action, VNF-O 25 (or a core component or a leaf component) and/or security management module 11, may initiate one or more security VNF instances 23 in one or more hardware units directly connected with hardware unit 45, for example, VNF instances 23 designated by numeral 122 of hardware unit 44. This action reduces the load on the network 10 as a whole. It is appreciated that as the attack is blocked closer to the source the network congestion is reduced.

It is also appreciated that a common DDoS attach involves many attacking hardware units such as hardware unit 45. Therefore, the implementation of the third optional action may involve many hardware units such as hardware unit 44. It is assumed that the third optional action may involve more hardware units (such as hardware unit 44) than the first and second optional actions. Therefore, the load experienced by the network 10 is reduced and also the load experienced by any hardware unit of network 10 is reduced.

The customer serviced by hardware unit 45 is probably unaware of the outbound attack from hardware unit 45, however, this hostile activity also loads hardware unit 45 itself and its transmission lines 21. It is therefore beneficial for the customer serviced by hardware unit 45 to remove the malicious software from hardware unit 45.

As a fourth optional action, VNF-O 25 (or a core component or a leaf component) and/or security management module 11, may initiate one or more security VNF instances 23 (designated by numeral 123) in hardware unit 45, for example, to block communications from hardware unit 45 to hardware unit 37. This fourth optional action reduces the load on the transmission lines 21 connecting hardware unit 45 to the rest of network 10 but does not reduce the load on hardware unit 45 itself.

As a fifth optional action, VNF-O 25 (or a core component or a leaf component) and/or security management module 11, may initiate one or more security VNF instances 23 (designated by numeral 124) in hardware unit 45, for example, to scan hardware unit 45 and remove the malicious software from hardware unit 45.

As a sixth optional action, VNF-O 25 (or a core component or a leaf component) and/or security management module 11, may initiate the cleansing of hardware unit 45 as described above with reference to FIGS. 9-11.

It is appreciated that the operator of NFV-based network 10 can provide its customers, such as the customer serviced by hardware unit 45, an automatic security service that is initiated according, and/or adapted to, security threats to other customers of network 10. Such service can be initiated automatically or semi-automatically, requireing a human approval.

A combination of two or more of the options described above is an example of a process in which a security attack detected by an NFV-O (leaf) component of a NFV-O hierarchy of a first customer is expended within the customer's NFV-O hierarchy, then it is expanded into the network's geographical NFV-O hierarchy, and then it is expanded into a service NFV-O hierarchy, and/or into an NFV-O hierarchy of a second customer.

It is appreciated that a security VNF instance 23 such as the security VNF instance designated by numeral 119 operating within a customer's NFV-O hierarchy or a service NFV-O hierarchy may be better tuned to detect a security attack than a general purpose security VNF instance operating within the general network (geographical) NFV-O hierarchy.

Figure 13:
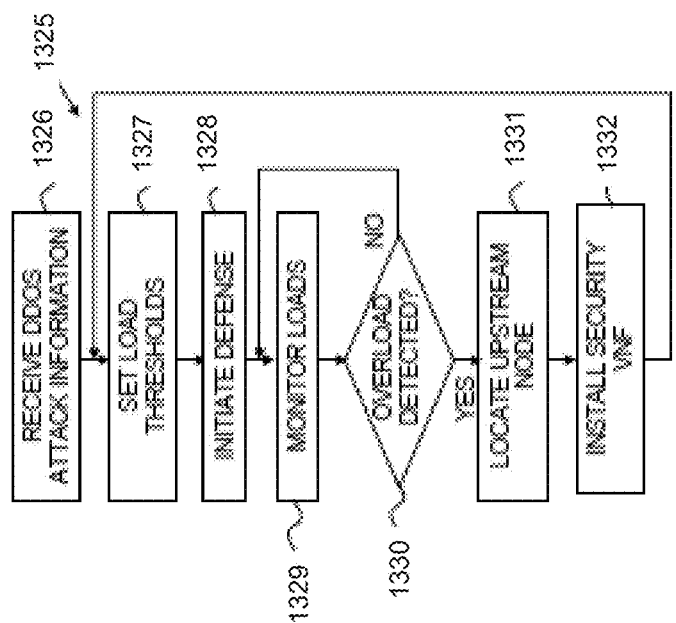
FIG. 13 illustrates a simplified block diagram of a security process within an NFV-based network defending against a DDoS attack, in accordance with one embodiment.

FIG. 13 illustrates a simplified diagram of a security process 1325 within an NFV-based network defending against a DDoS attack, in accordance with one embodiment. As an option, the diagram may be viewed in the context of the details of the previous Figures. Of course, however, the diagram may be viewed in the context of any desired environment. Further, the aforementioned definitions may equally apply to the description below.

It is appreciated that security process 1325 is an example of a process within an NFV-based network for migrating the defense against a DDoS (or similar) attack in the direction of the source of the attack.

It is also appreciated that security process 1325 is an example of a process within the NFV-based network for migrating the defense against a DDoS (or similar) attack within the NFV-based network according to rules or policies. Particularly, according to the present example embodied by the process 1325 the rules include load thresholds. Particularly, according to the present example embodied by the process 1325 the purpose of the rules is to reduce the load on the participating hardware units and/or transmission lines, for example, by increasing the number of participating hardware units and/or transmission lines.

As shown in FIG. 13, security process 1325 starts with step 1326, for example when an NFV-O (or a core component or a leaf component) and/or a security management module associated therewith receives information about an attack, such as a DDoS attack on a particular hardware unit, or on a VNF instance associated therewith.

The security process 1325 proceeds with step 1327 to set load thresholds, such as processing load thresholds and traffic load thresholds. The security process 1325 proceeds with step 1328 to initiate a defense against the DDoS attack and to step 1329 to monitor the relevant loads.

The security process 1325 proceeds to step 1330 to compare the monitored loads with their respective thresholds and determine one or more overload conditions. If an overload exists, the security process 1325 proceeds to step 1331 to locate one or more upstream nodes (e.g., hardware units), install a security VNF therewith (step 1332), set additional load thresholds, and initiate one or more security VNF instances.

More information regarding optional NFV network security techniques may be found in U.S. Provisional Patent Application No. 62/033,615, titled "SYSTEM, METHOD, AND COMPUTER PROGRAM FOR IMPLEMENTING A VIRTUAL OBFUSCATION SERVICE IN A NETWORK", which is incorporated by reference herein in its entirety.

Figure 14:
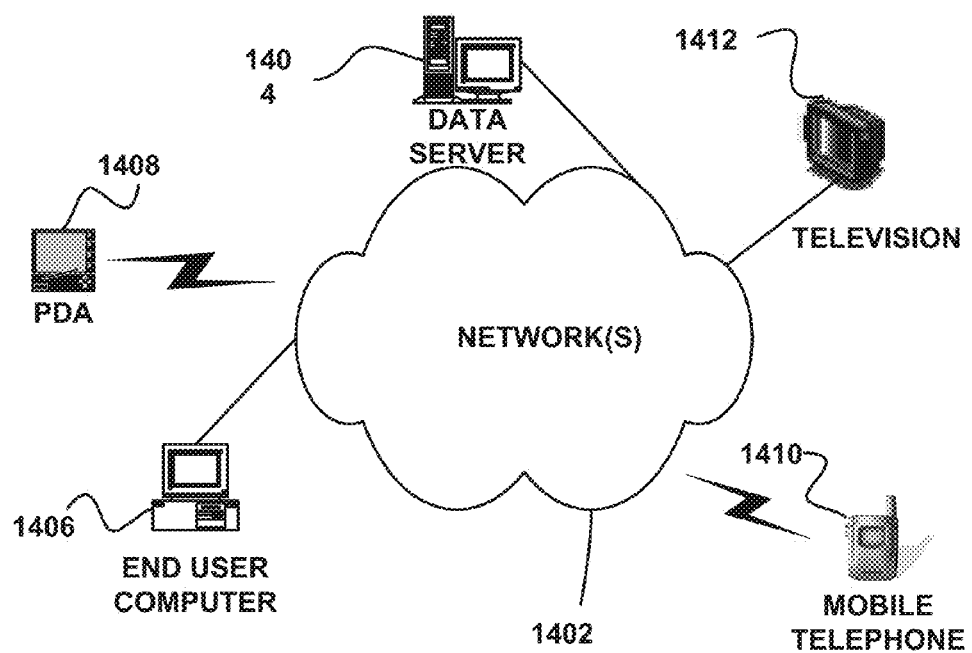
FIG. 14 illustrates a network architecture, in accordance with one possible embodiment.

FIG. 14 illustrates a network architecture 1400, in accordance with one possible embodiment. As shown, at least one network 1402 is provided. In the context of the present network architecture 1400, the network 1402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1402 may be provided.

Coupled to the network 1402 is a plurality of devices. For example, a server computer 1404 and an end user computer 1406 may be coupled to the network 1402 for communication purposes. Such end user computer 1406 may include a desktop computer, lap-top computer, and/or any other type of logic. Still yet, various other devices may be coupled to the network 1402 including a personal digital assistant (PDA) device 1408, a mobile phone device 1410, a television 1412, etc.

Figure 15:
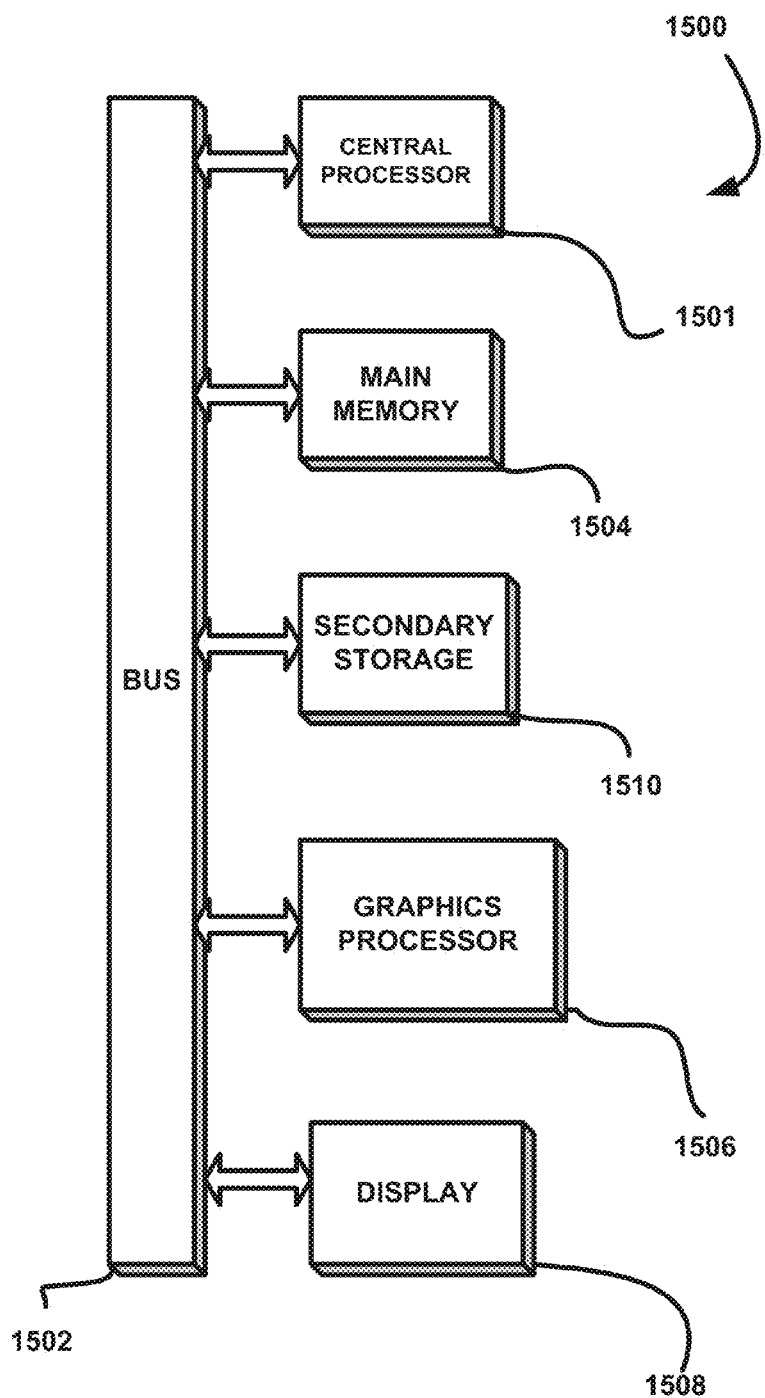
FIG. 15 illustrates an exemplary system, in accordance with one embodiment.

FIG. 15 illustrates an exemplary system 1500, in accordance with one embodiment. As an option, the system 1500 may be implemented in the context of any of the devices of the network architecture 1400 of FIG. 14. Of course, the system 1500 may be implemented in any desired environment.

As shown, a system 1500 is provided including at least one central processor 1501 which is connected to a communication bus 1502. The system 1500 also includes main memory 1504 [e.g. random access memory (RAM), etc.]. The system 1500 also includes a graphics processor 1506 and a display 1508.

The system 1500 may also include a secondary storage 1510. The secondary storage 1510 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1504, the secondary storage 1510, and/or any other memory, for that matter. Such computer programs, when executed, enable the system 1500 to perform various functions (as set forth above, for example). Memory 1504, storage 1510 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying, by a first hardware unit in a Network Function Virtualization based (NFV-based) network, that a security attack has occurred within the first hardware unit;
   responsive to identifying the security attack, identifying by the first hardware unit a second hardware unit in the NFV-based network that is operative to replace the first hardware unit;
   initiating, by the first hardware unit, a migration of functionality of the first hardware unit to the identified second hardware unit; and
   after the functionality of the first hardware unit is migrated to the second hardware unit, executing a security defense software program in the first hardware unit to cleanse the first hardware unit; and
   after the first hardware unit is cleansed, reinitiating the migrated functionality at the first hardware unit.

2. The method of claim 1, wherein initiating the migration of functionality of the first hardware unit to the identified second hardware unit includes:
   determining whether the identified second hardware unit already includes code to perform the functionality;
   responsive to determining that the identified second hardware unit does not already include the code, initiating installation of the code on the second hardware unit;
   determining whether the identified second hardware unit already includes data required to execute the functionality without causing a session and/or service discontinuity otherwise resulting from the migrating;
   responsive to determining that the identified second hardware unit does not already include the data, initiating a provisioning of the data to the second hardware unit from a mirroring facility or a backup facility;

once the second hardware unit has the code and the data, configuring the second hardware unit according to parameters of the first hardware unit; and after the configuring, diverting communications incoming to the first hardware unit to the second hardware unit.

3. A computer program product embodied in a computer storage device having computer code, when executed by a computer hardware processor, to perform functions of:
   identifying, by a first hardware unit in a Network Function Virtualization based (NFV-based) network, that a security attack has occurred within the first hardware unit;
   responsive to identifying the security attack, identifying by the first hardware unit a second hardware unit in the NFV-based network that is operative to replace the first hardware unit;
   initiating, by the first hardware unit, a migration of functionality of the first hardware unit to the identified second hardware unit; and
   after the functionality of the first hardware unit is migrated to the second hardware unit, executing a security defense software program in the identified first hardware unit to cleanse the first hardware unit; and
   after the first hardware unit is cleansed, reinitiating the migrated functionality at the first hardware unit.

4. A system comprising:
   a memory system of a first hardware unit in a Network Function Virtualization based (NFV-based) network; and
   one or more hardware processing cores of the first hardware unit that are coupled to the memory system and that are each configured to:
   identify, by the first hardware unit, that a security attack has occurred within the first hardware unit;
   responsive to identifying the security attack, identify by the first hardware unit a second hardware unit in the NFV-based network that is operative to replace the first hardware unit;
   initiate, by the first hardware unit, a migration of functionality of the first hardware unit to the identified second hardware unit; and
   after the functionality of the first hardware unit is migrated to the second hardware unit, execute a security defense software program in the first hardware unit to cleanse the first hardware unit; and
   after the first hardware unit is cleansed, reinitiate the migrated functionality at the first hardware unit.

* * * * *